United States Patent
Yang et al.

(10) Patent No.: US 10,402,697 B2
(45) Date of Patent: Sep. 3, 2019

(54) FUSING MULTILAYER AND MULTIMODAL DEEP NEURAL NETWORKS FOR VIDEO CLASSIFICATION

(71) Applicant: NVIDIA Corporation, Santa Clara, CA (US)

(72) Inventors: Xiaodong Yang, San Jose, CA (US); Pavlo Molchanov, San Jose, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 75 days.

(21) Appl. No.: 15/660,719

(22) Filed: Jul. 26, 2017

(65) Prior Publication Data

US 2018/0032846 A1    Feb. 1, 2018

Related U.S. Application Data

(60) Provisional application No. 62/369,688, filed on Aug. 1, 2016.

(51) Int. Cl.

| | |
|---|---|
| G06K 9/62 | (2006.01) |
| G06K 9/00 | (2006.01) |
| G06K 9/66 | (2006.01) |
| G06K 9/46 | (2006.01) |
| G06N 3/04 | (2006.01) |
| G06N 3/08 | (2006.01) |
| G06N 20/10 | (2019.01) |

(52) U.S. Cl.
CPC ........ *G06K 9/6293* (2013.01); *G06K 9/00711* (2013.01); *G06K 9/00718* (2013.01); *G06K 9/00744* (2013.01); *G06K 9/4604* (2013.01); *G06K 9/4628* (2013.01); *G06K 9/66* (2013.01); *G06N 3/04* (2013.01); *G06N 3/0445* (2013.01); *G06N 3/0454* (2013.01); *G06N 3/08* (2013.01); *G06N 20/10* (2019.01)

(58) Field of Classification Search
CPC ............ G06K 9/6293; G06K 9/00711; G06K 9/4604; G06K 9/00744; G06K 9/4628; G06K 9/00718; G06K 9/66; G06N 3/04
See application file for complete search history.

(56) References Cited

U.S. PATENT DOCUMENTS

| | | | |
|---|---|---|---|
| 2006/0110028 A1* | 5/2006 | Liu | G06K 9/00711 382/159 |
| 2014/0161362 A1* | 6/2014 | Cao | G06K 9/6202 382/224 |
| 2016/0140436 A1* | 5/2016 | Yin | G06N 3/08 706/20 |

(Continued)

*Primary Examiner* — Ming Y Hon
(74) *Attorney, Agent, or Firm* — Leydig, Voit & Mayer, Ltd.

(57) ABSTRACT

A method, computer readable medium, and system are disclosed for classifying video image data. The method includes the steps of processing training video image data by at least a first layer of a convolutional neural network (CNN) to extract a first set of feature maps and generate classification output data for the training video image data. Spatial classification accuracy data is computed based on the classification output data and target classification output data and spatial discrimination factors for the first layer are computed based on the spatial classification accuracies and the first set of feature maps.

20 Claims, 16 Drawing Sheets

(56) References Cited

U.S. PATENT DOCUMENTS

| | | | |
|---|---|---|---|
| 2016/0162782 A1* | 6/2016 | Park | G06N 3/0454 |
| | | | 706/17 |
| 2016/0307071 A1* | 10/2016 | Perronnin | G06K 9/4628 |
| 2017/0083796 A1* | 3/2017 | Kim | G06K 9/00369 |
| 2017/0140526 A1* | 5/2017 | Chen | G06K 9/3233 |
| 2017/0177943 A1* | 6/2017 | Mehrseresht | G06T 7/248 |
| 2017/0337471 A1* | 11/2017 | Kadav | G06F 17/153 |
| 2018/0032840 A1* | 2/2018 | Yu | G06T 7/11 |
| 2018/0260698 A1* | 9/2018 | Lin | G06N 3/08 |

\* cited by examiner

FUSING MULTILAYER AND MULTIMODAL DEEP NEURAL NETWORKS FOR VIDEO CLASSIFICATION

CLAIM OF PRIORITY

This application claims the benefit of U.S. Provisional Application No. 62/369,688 titled "MULTILAYER AND MULTIMODAL FUSION OF DEEP NEURAL NETWORKS FOR VIDEO CLASSIFICATION," filed Aug. 1, 2016, the entire contents of which is incorporated herein by reference.

FIELD OF THE INVENTION

The present invention relates to video classification, and more particularly to video classification using deep neural networks.

BACKGROUND

Content based video classification is fundamental to intelligent video analytics (IVA) and includes automatic categorizing, searching, indexing, segmentation, and retrieval of videos. It has been applied to a wide range of real world applications, for instance, multimedia event detection, semantic indexing, gesture control, etc. However, recognizing unconstrained videos is a challenging task because (i) an appropriate video representation can be task dependent, e.g., coarse ("swim" vs. "run") or fine-grained ("walk" vs. "run") categorizations, (ii) there may be multiple streams of information that need to be taken into account, such as actions, objects, scenes, and so forth, and (iii) there are large intra-class variations, which arise from diverse viewpoints, occlusions and backgrounds. As the core information of videos, visual cues provide the most significant information for video classification.

Recently, deep convolutional neural networks (CNN) have proven to be effective for action recognition and video classification. Although significant progress in recent years has been achieved in the development of feature learning by deep neural networks, it is clear that the features that are extracted by the neural networks do not have the same discriminative capability over all classes. Therefore, conventional video classification techniques adaptively combine a set of complementary features. The conventional techniques focus on short-term information because the representations of the complementary features are learned in short time durations. The short-term information is insufficient for video classification because complex events are better described by leveraging the temporal evolution of short-term contents. Consequently, there is no single and unified solution for all classes of videos. There is a need for addressing these issues and/or other issues associated with the prior art.

SUMMARY

A method, computer readable medium, and system are disclosed for performing video classification using deep neural networks. The method includes the steps of processing training video image data by at least a first layer of a convolutional neural network (CNN) to extract a first set of feature maps and generate classification output data for the training video image data. Spatial classification accuracy data is computed based on the classification output data and target classification output data and spatial discrimination factors for the first layer are computed based on the spatial classification accuracies and the first set of feature maps.

In one embodiment, modified aggregated feature descriptors are computed for multiple layers of the CNN (i.e., the video classification technique is multilayer). The video classification technique may be applied to different types (i.e., modalities) of input video image data, with a separate CNN processing each modality. In one embodiment, classification output data produced for each modality is combined to generate classification output data (i.e., the video classification technique is multimodal).

DETAILED DESCRIPTION

A video image data classification technique extracts features by processing input image data or snippet data (i.e., a short video clip) using a set of learned parameters to generate a class label for the video (i.e., classification output data). Each layer of a convolutional neural network (CNN)

extracts features. Typically the extracted features generated by each layer are input to the subsequent layer to produce the classification output data. During training, classification accuracy data is computed by comparing the classification output data with a target classification output.

In contrast with the prior art, following conventional training of a CNN, post-processing is performed during which training image data is input to the CNN and the features generated by one or more layers of the CNN are extracted and processed. The extracted features for each frame or snippet of video are captured as a set of feature maps for at least one layer. In contrast with the prior art, the video classification technique computes a modified aggregated feature descriptor (i.e., weighted Fisher Vectors, wFV) for at least one layer using spatial discriminative factors (i.e., weights) for the layer and the set of feature vectors. The modified aggregated feature descriptors are then used during inferencing to classify the new input image data. The modified aggregated feature descriptors may be computed for multiple layers of the CNN (i.e., the video classification technique is multilayer). The video classification technique may be applied to different types (i.e., modalities) of input video image data, with a separate CNN processing each modality. The classification output data produced by each of the CNNs is combined to generate classification output data (i.e., the video classification technique is multimodal).

Figure 1A:
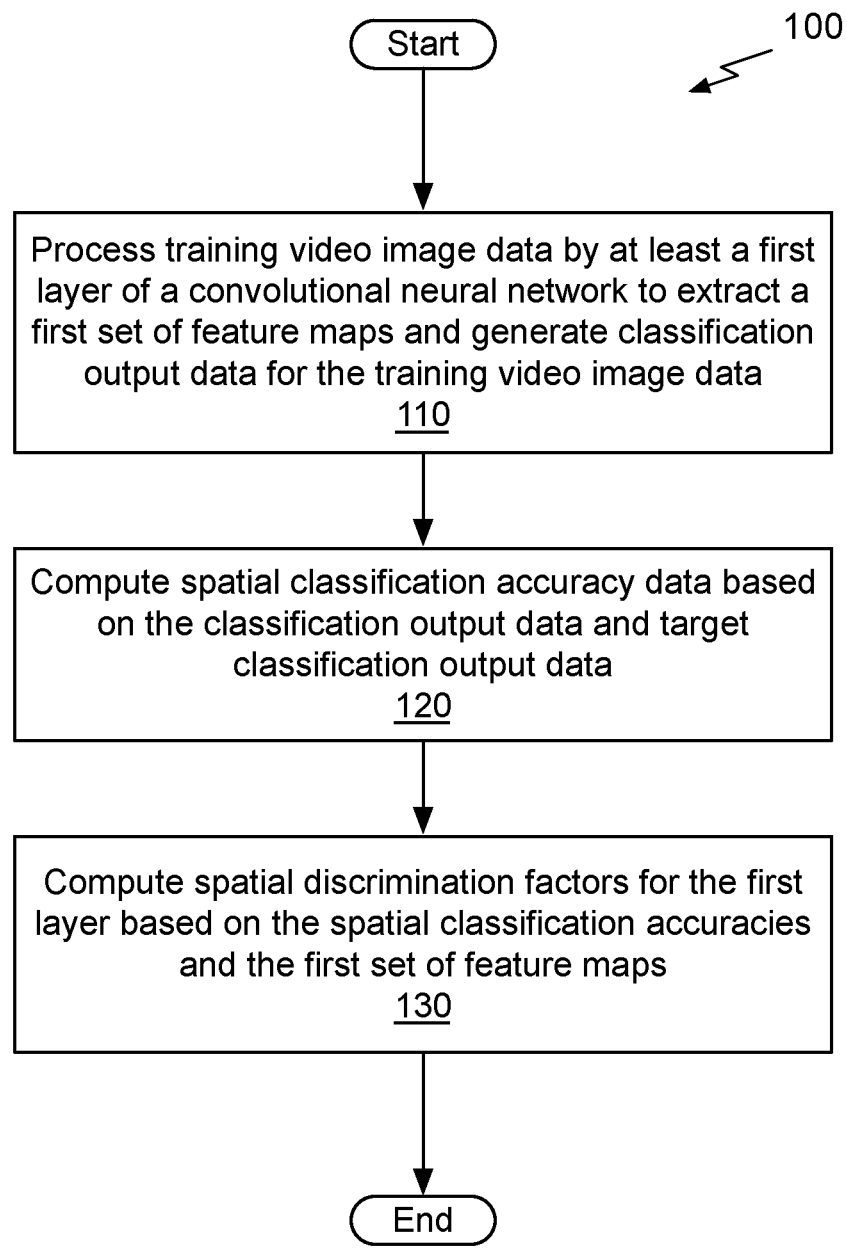
FIG. 1A illustrates a flowchart of a method for classifying video image data using deep neural networks, in accordance with one embodiment.

FIG. 1A illustrates a flowchart of a method for classifying video image data using deep neural networks, in accordance with one embodiment. The method 100 is described in the context of a CNN, and the method 100 may also be performed by a program, custom circuitry, or by a combination of custom circuitry and a program. For example, the method 100 may be executed by a GPU, CPU, or any processor capable of performing the necessary processing operations. Furthermore, persons of ordinary skill in the art will understand that any system that performs method 100 is within the scope and spirit of embodiments of the present invention.

At step 110, training video image data is processed by at least a first layer of a CNN to extract a first set of feature maps and generate classification output data for the training video image data. In the context of the following description, classification output data is a class label for at least one image of video input data. In one embodiment, a class label for the training video image data is produced based on the first set of feature maps that is processed by at least the first layer of the CNN. In one embodiment, a class label is a class-conditional probability vector associated with the training video image data.

In one embodiment, the CNN is a two-dimensional (2D) CNN and the training video image data corresponds to a single image or a single video frame. In one embodiment, the CNN is a three-dimensional (3D) CNN and the training video image data corresponds to a snippet, clip, or sequence of video frames. In one embodiment, the CNN is configured to process training video image data of one modality such as spatial (color) or optical flow. Optical flow data may be computed from video image data. In one embodiment, the optical flow data is represented by three color channels. After the CNN is trained, post-processing is performed to compute spatial classification accuracy data.

At step 120, the spatial classification accuracy data is computed based on the classification output data and target classification output data. Conventionally, a single classification accuracy value, such as a probability is computed for each image. In contrast, when video image data is classified using deep neural networks, such as a 2D or 3D CNN during step 110, classification accuracy data is computed for spatial regions associated with each image across a video (i.e., frames or snippets in a video sequence).

Each image in the video image data is divided into overlapping pixel regions referred to as receptive fields. Each feature map is divided into non-overlapping spatial regions including one or more features or elements $x_i$ that each correspond to a portion of the pixels (e.g., 2×2 pixel regions). Each spatial region is associated with a receptive field of the input image data and classification accuracy data is computed for each spatial region of each feature map.

At step 130, spatial discrimination factors are computed for the first layer based on the spatial classification accuracies and the first set of feature maps. In one embodiment, each classification accuracy $\alpha_j$ is transformed to a spatial discriminative factor $w_j$ using a softmax function $w_j = \exp(\alpha_j)/\Sigma_{k=1}^{|R|} \exp(\alpha_k)$. In one embodiment, each classification accuracy is transformed to a spatial discriminative factor $w_j$ using a sigmoid function $w_j = 1/[1+\exp(\alpha - \alpha_j)]$, where $\alpha'$ is a parameter to control the relative weight. All features $x_i$ of spatial region $R_j$ in the feature map share the same spatial discriminative factor $w_j$.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

During the post-processing, spatial classification accuracy data is generated for each spatial region and the spatial discriminative factors are computed. During inferencing, extracted features for new input image data to be classified are captured as a set of feature maps for each layer. Because feature maps are generated for each layer during inferencing, no additional computation is performed. However, the feature maps for one or more of the layers are captured. In contrast, conventional techniques simply pass the features maps to the subsequent layer without using the feature maps for any post-processing.

The captured set of feature maps and spatial discriminative factors (computed during post-processing) for each layer are used to compute modified aggregated feature descriptors (i.e., weighted Fisher Vectors) for the layer. The modified aggregated feature descriptors are then used to classify the new input image data during inferencing. In one embodiment, the modified aggregated feature descriptors are computed on-the-fly during inferencing. In one embodiment, the captured set of feature maps for one or more layers is stored. In contrast, conventional techniques simply pass the feature maps to the subsequent layer without computing spatial discriminative factors, computing modified aggregated feature descriptors, and/or storing the feature maps for any post-processing.

Modified aggregated feature descriptors may be computed for multiple layers of the CNN to improve classification accuracy. In one embodiment, classification output data is determined based on the modified aggregated feature descriptors for two or more layers of the CNN. More specifically, the classification data (i.e., predictions) produced for each layer may be combined to generate classification output data (i.e., the video classification technique is multilayer).

The video classification technique may be applied to different representations (i.e., modalities) of input video image data. Example 2D modalities include a single frame of spatial data (color) and a single frame of optical flow data. Example 3D modalities include multiple frames of spatial data (color) and multiple frames of optical flow data. Multiple CNNs may be used to improve classification accuracy by extracting diverse static and dynamic cues at multiple temporal scales to classify input video image data represented in two or more modalities. The classification output data produced by each of the CNNs may be combined to generate classification output data (i.e., the video classification technique is multimodal).

A multilayer and multimodal fusion framework of deep neural networks for video classification can simultaneously capture a variety of levels of abstractions in a single neural network, which is able to adapt from coarse- to fine-grained categorizations. For the fusion of multiple layers and modalities, a powerful fusing model may be employed to learn the optimal combination of multilayer and multimodal predictions to produce a class label.

Multilayer CNN Architecture

For video classification, appropriate levels of abstraction and invariance for video representation in a CNN are task-dependent and class-dependent. For example, distinguishing "soccer game" and "basketball game" requires high-level representations to model global scene statistics. However, classification of "playing guitar" and "playing violin" demands fine-scale features to capture subtle appearance and motion features. Therefore, leveraging abstractions of the individual convolutional layers of a CNN can improve video classification accuracy because the convolutional layers of a CNN capture different levels of semantic abstractions and retain spatial information.

Figure 1B:
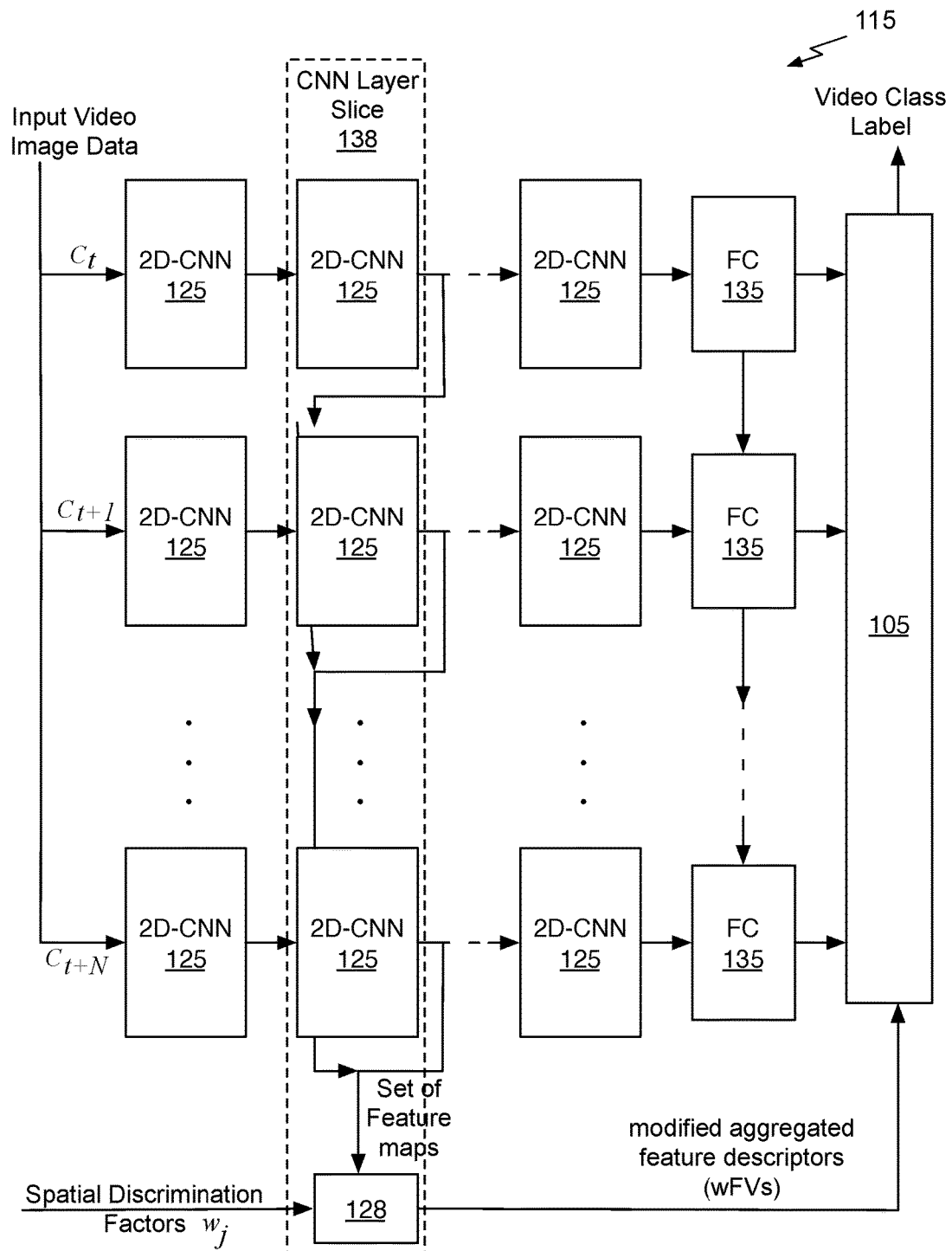
FIG. 1B illustrates a block diagram of a system for classifying video image data, in accordance with one embodiment.

FIG. 1B illustrates a block diagram of a video classification system 115 for classifying video image data, in accordance with one embodiment. Input video image data may be presented in the form of single frames C, to the 2D-CNNs 125 for extracting local spatial-temporal features by applying learnable filters at each time t to generate a set of feature maps for each 2D-CNN layer. Each learnable filter is a multi-dimensional kernel that is determined when the 2D-CNN 125 is trained.

A 2D-CNN layer is shown in FIG. 1B as a CNN layer slice 138 that includes a wFV computation unit 128 and 2D-CNNs 125 that each generate a feature map that is included in a set of feature maps for the layer. The wFV computation unit 128 receives the spatial discrimination factors $w_j$ that were computed during post-processing and computes modified aggregated feature descriptors (i.e., wFVs) for each spatial region in the set of feature maps and the spatial discrimination factors $w_j$. Two possible equations for computing the spatial discrimination factors $w_j$ are described in conjunction with step 130 of FIG. 1A. Although, as shown in FIG. 1B, wFVs are computed for only one of the 2D-CNN layers, in other embodiments, wFVs may be computed for multiple or even all of the 2D-CNN layers.

Two or more CNN layers may be connected in series. The set of feature maps generated by a first layer is output to the 2D-CNNs 125 in a second layer, and so on until a fully connected (FC) layer including FCs 135 receives the last set of feature maps generated by the 2D-CNN layers. A classification unit 105 receives the outputs of the FCs 135 and the modified aggregated feature descriptors and generates a video class label. In one embodiment, the outputs of the FCs 135 are processed by a temporal max pooling layer that applies a down-sampling operator to reduce temporal dimensions of internal multi-dimensional tensor before being processed by the classification unit 105.

Each one of the CNN layers may exaggerate different characteristics of objects and similar characteristics are often grouped within each feature map. For example, the different characteristics may include poses, colors, parts, shapes, articulations, object boundaries, patterns, and the like. Therefore, sets of features for appropriate levels of compositionality for the different CNN layers supply diverse fine-scale information for classification. Meanwhile, the feature maps from each layer are already generated for input to the subsequent layer, so that no additional computation is performed to produce the sets of feature maps.

Figure 1C:
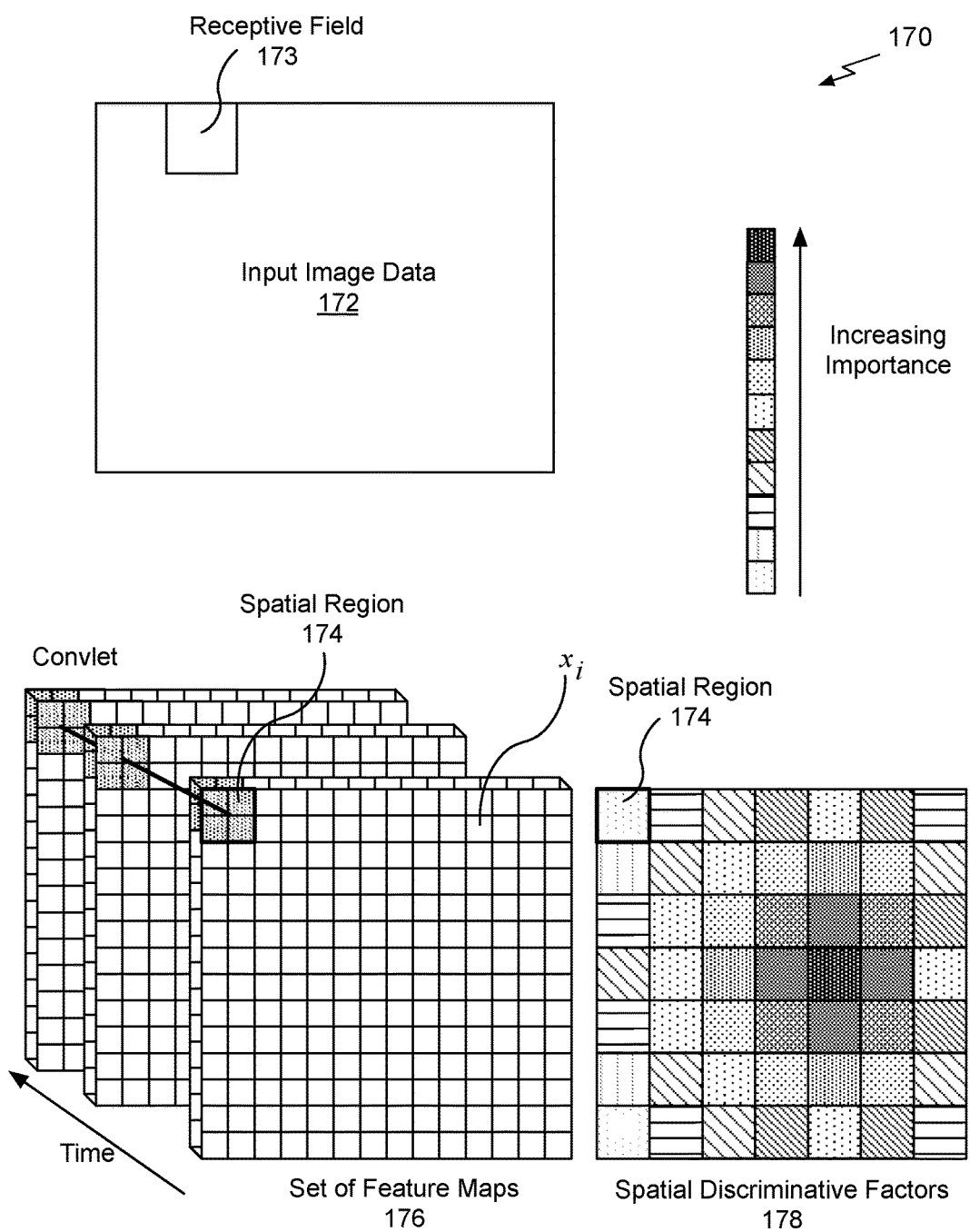
FIG. 1C illustrates a conceptual diagram of feature maps and spatial discriminative factors, in accordance with one embodiment.

FIG. 1C illustrates a conceptual diagram 170 of a set of feature maps 176 and associated spatial discriminative factors 178, in accordance with one embodiment. When produced by a 2D-CNN 125, each feature map in the set of feature maps 176 is associated with one frame. When produced by a 3D-CNN, each feature map in the set of feature maps 176 is associated with one video snippet or one short video sequence.

A receptive field 173 that includes a portion of the pixels within the input image data 172 is associated with a spatial region 174 within each feature map in the set of feature maps 176. In one embodiment, adjacent receptive fields 173 may overlap for one or more pixels of the input image data 172. In one embodiment, at least one dimension of each receptive field 173, in pixels, is larger than at least one dimension of a corresponding spatial region 174.

The set of feature maps 176 is converted to a set of feature descriptors (i.e., vectors), where each feature descriptor in the set corresponds to at least one element $x_i$ in the feature maps. For example, a 28×28×3 set of feature maps may be converted to 28×28 feature descriptors that each include 3 elements. The feature descriptors within each receptive field 173 (or spatial region 174) are aggregated over time to generate convlets (convolutional elements), where each convlet corresponds to a particular receptive field 173 of the input image data (and a corresponding spatial region 174 of each feature map). Each convlet is a one-dimensional vector of values corresponding to a set of feature maps aggregated in spatial and temporal dimensions and the convlets are stored in a data structure. The convlets measure the spatial discriminability of activations at a CNN layer. Assume $s_l$ is the size (height and width) of a feature map and $d_l$ denotes the total number of feature maps. A set of feature maps extracted from a video is represented by $C=\{c_{t,l}; t=1, \ldots, T; l=1, \ldots, L_c\}$, where T is the number of frames or short clips, $L_c$ is the number of feature maps in the set, and $c_{t,l} \in \mathbb{R}^{s_l \times s_l \times d_l}$ indicates the l-th feature map computed at the t-th timestamp. The feature maps $c_{t,l}$ are converted to $s_l \times s_l$ feature descriptors, each of which includes di elements. Therefore, a video can generate $n_l = s_l \times s_l \times T$ feature descriptors $x_i \in \mathbb{R}^{d_l}$ at the l-th CNN layer, where $i=1, \ldots, n_l$. Let R indicate the pre-defined spatial regions 174 for a CNN layer and $R_j$ denote the j-th spatial region 174. The convlet corresponding to the spatial region 174 is:

$$q_j = \mathcal{G}(\{x_i\}_{i \in R_j}), j=1, \ldots |R|,$$

where $\mathcal{G}$ is a general coding and pooling operator. In one embodiment, $\mathcal{G}$ is a Fisher vector. The convlet $q_j$ is a representation that aggregates $x_i$ in a spatial region 174 over time for the input image data. Each convlet $q_j$ may be used to perform video classification. As previously explained, classification accuracy $\alpha_j$ values associated with $R_j$ indicates a discriminative value for each spatial region 174 is for a CNN layer and the classification accuracy values are transformed into spatial discriminative factors $w_j$.

A spatial discriminative factor corresponding to a spatial region 174 indicates how discriminative or important each of the spatial regions 174 in a CNN layer is for determining a class label. As shown in FIG. 1C, the different patterns in a "heat map" indicate increasing importance of the spatial discriminative factors 178. Specifically, the spatial regions 174 towards the right side of the center of the spatial discriminative factors 178 have a greater importance compared with the spatial regions at the edges of the spatial discriminative factors 178. The upper and lower spatial regions 174 in the corners on the left side are the least discriminative. Each spatial region 174 in the spatial discriminative factors 178 is associated with a respective spatial region 174 in each feature map included in the set of feature maps 176. Each spatial region 174 includes one or more elements $x_i$ in the feature map (e.g., each spatial region 174 includes 2×2 $x_i$). The value of a spatial discriminative factor 178 for a particular element $x_i$ in the feature map indicates the importance of the element in terms of classification operations. For a different CNN layer, the importance of each spatial region 174 as indicated by the spatial discriminative factors 178 may vary. Because the spatial discriminative factors $w_j$ for each $x_i$ represent how discriminative or important $x_i$ is for classification, the spatial discriminative factors $w_j$ may be used to improve classification accuracy.

The features $x_i$ have a Gaussian mixture model (GMM) distribution characterized by parameters $\{\pi_k, \mu_k, \sigma_k\}$ with k=1, . . . , K, where $\pi_k$, $\mu_k$, and $\sigma_k$ are the prior mode probability, mean, and covariance (diagonal) of the k-th Gaussian component $\varphi_k$.

To better fit the diagonal covariance assumption, principal component analysis (PCA) may be applied to decorrelate $x_i$ and reduce feature dimensions. Each feature $x_i$ is then encoded by the deviations with respect to the parameters of GMM. Let $\gamma_{i,k}$ be the soft assignment of $x_i$ to the k-th Gaussian component:

$$\gamma_{i,k} = \frac{\pi_k \varphi_k(x_i)}{\sum_{j=1}^{K} \pi_j \varphi_j(x_i)}.$$

The modified aggregated feature descriptor (i.e., wFV) representation of video input data at a CNN layer may be obtained by concatenating the following derivative vectors from K Gaussian components:

$$\rho_k = \frac{1}{n_l \sqrt{\pi_k}} \sum_{i=1}^{n_l} \gamma_{i,k} w_i \left(\frac{x_i - \mu_k}{\sigma_k}\right),$$

$$\tau_k = \frac{1}{n_l \sqrt{2\pi_k}} \sum_{i=1}^{n_l} \gamma_{i,k} w_i \left[\frac{(x_i - \mu_k)^2}{\sigma_k^2} - 1\right],$$

where $\rho_k$ and $\tau_k$ are the di-dimensional derivatives with respect to $\mu_k$ and $\sigma_k$ of the k-th Gaussian component. The spatial discriminative factor $w_i$ is applied to weight the relative displacements of $x_i$ to the mean and covariance in the equations for computing $\rho_k$ and $\tau_k$. In other words, the spatial discriminative factors are applied to scale relative displacements for computing $\rho_k$ and $\tau_k$ (i.e., wFV). Applying the spatial discriminative factor as a weight causes more informative features to gain higher contributions in the final representation, while background or noisy features are suppressed. Modified aggregated feature descriptors (i.e., wFVs) may be computed for one or more selected CNN layers over time and used to classify the input video image data.

Figure 1D:
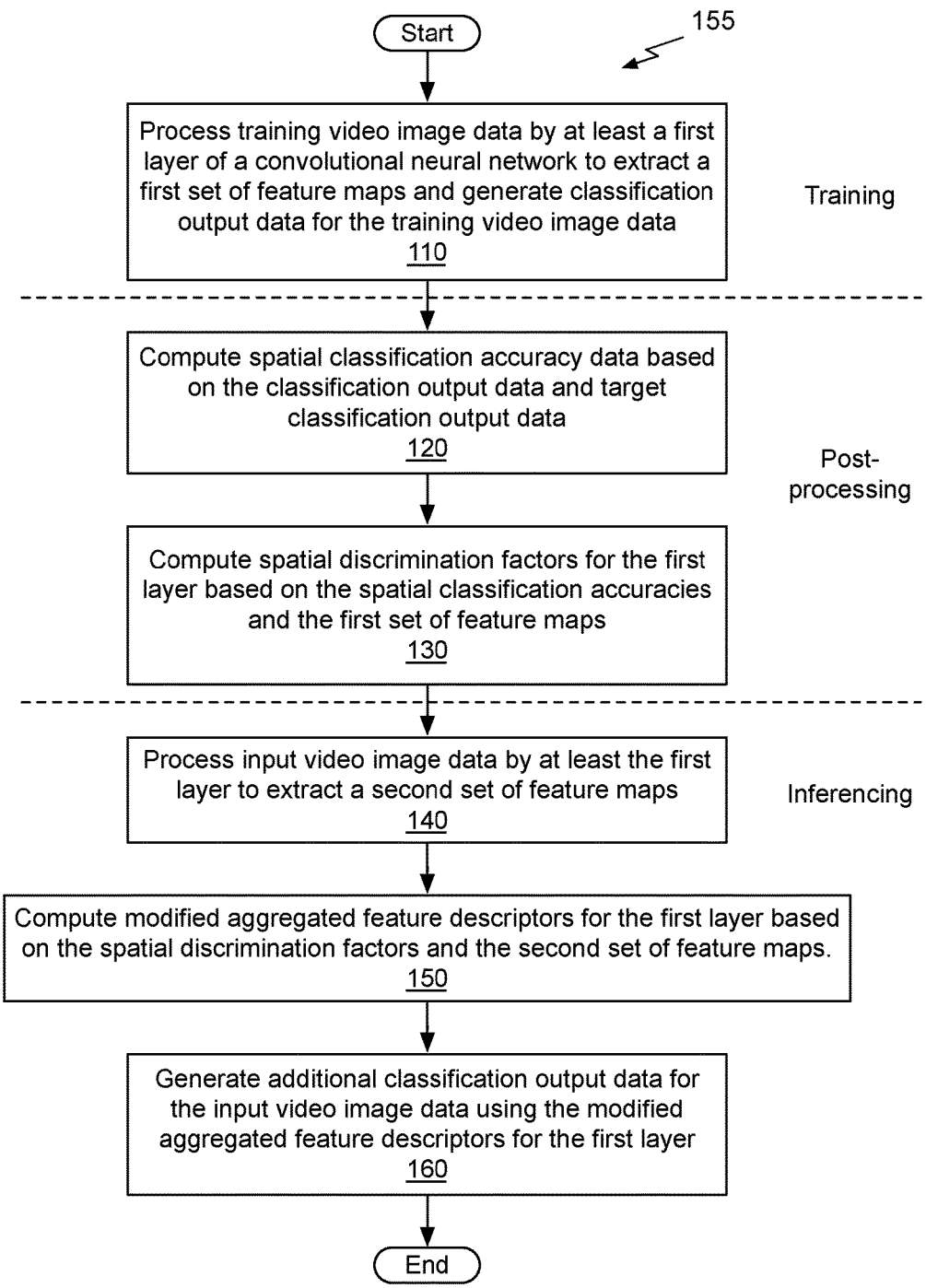
FIG. 1D illustrates a flowchart of another method for classifying video image data using deep neural networks, in accordance with one embodiment.

FIG. 1D illustrates a flowchart of another method 155 for classifying video image data using deep neural networks, in accordance with one embodiment. The method 155 is described in the context of a CNN, and the method 155 may also be performed by a program, custom circuitry, or by a combination of custom circuitry and a program. For example, the method 155 may be executed by a GPU, CPU, or any processor capable of performing the necessary processing operations. Furthermore, persons of ordinary skill in the art will understand that any system that performs method 155 is within the scope and spirit of embodiments of the present invention.

Steps 110, 120, and 130 are performed as previously described in conjunction with FIG. 1A to complete the training and post-processing. At step 140, new input video image data is processed by at least the first layer of the CNN to extract a second set of feature maps. In one embodiment, the first layer of the CNN is the CNN layer slice 138 shown in FIG. 1B. In the context of the following description, the first layer, second layer, etc. does not necessarily indicate the order in which CNN layers are coupled in series.

At step 150, modified aggregated feature descriptors (i.e., wFVs) are computed for the first CNN layer based on the spatial discriminative factors $w_j$ that were computed at step 130 and the second set of feature maps. In one embodiment, the modified aggregated feature descriptors are computed by the wFV computation unit 128 shown in FIG. 1B. At step 160, additional classification output data is generated for the new input video image data using the modified aggregated feature descriptors for the first layer. In one embodiment, the additional classification output data includes class labels.

Figure 1E:
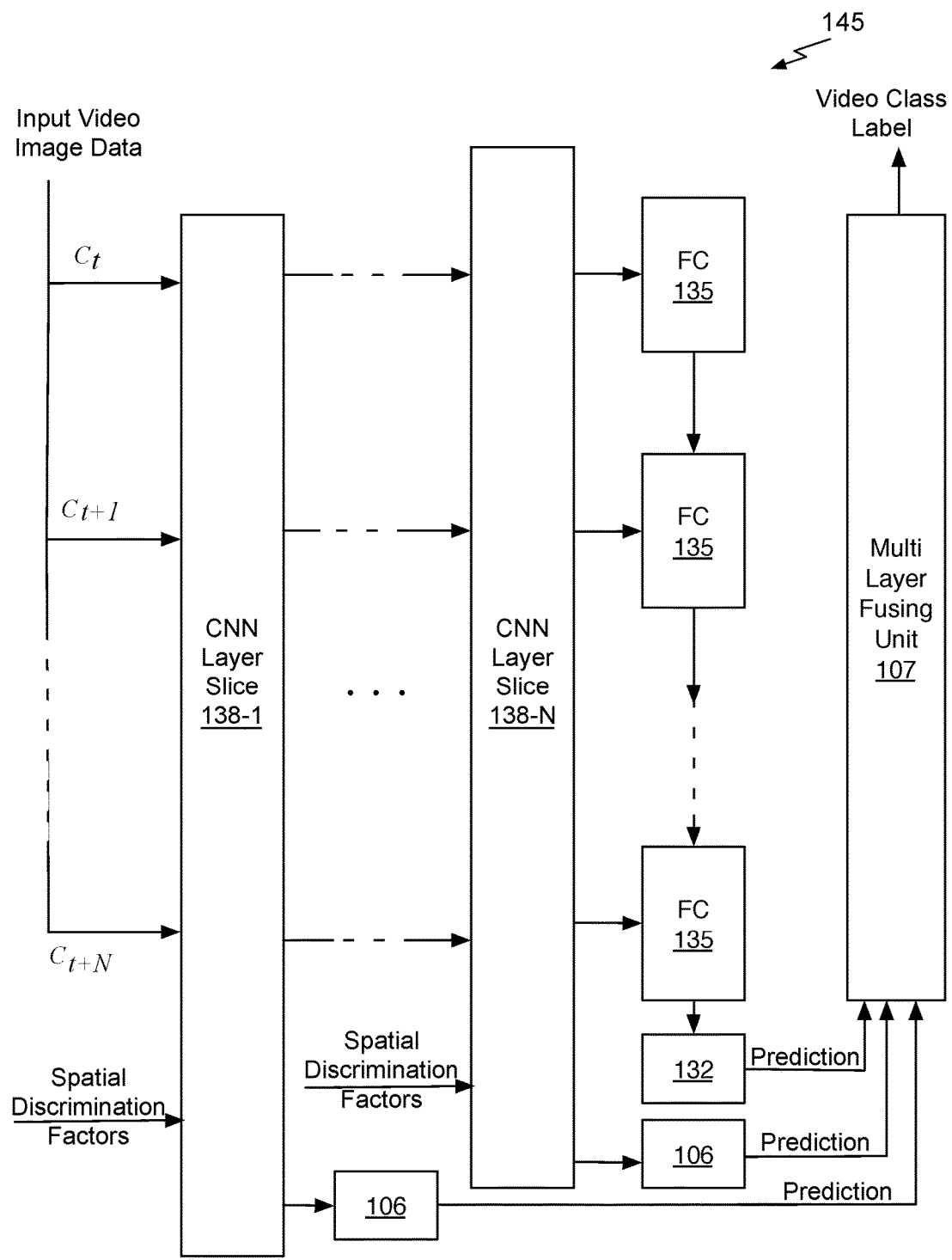
FIG. 1E illustrates a block diagram of a system that uses multilayer fusing to classify video image data, in accordance with one embodiment.

FIG. 1E illustrates a block diagram of a video classification system 145 that uses multilayer fusing to classify video image data, in accordance with one embodiment. Input video image data may be presented in the form of single frames C, to the CNN layer slice 138-1 to generate a set of feature maps for the CNN layer slice 138-1. A number N of CNN layer slices 138 may be connected in series and the feature maps generated by each layer are output to the subsequent layer slice, until a fully connected (FC) layer including FCs 135 receives the last set of feature maps generated by the CNN layer slice 138-N.

Each CNN layer slice 138 receives the spatial discrimination factors $w_j$ that were computed during post-processing for the particular layer and computes modified aggregated feature descriptors (i.e., wFVs). Although, as shown in FIG. 1E, wFVs are computed for all of the 2D-CNN layers, in other embodiments, wFVs may be computed for only a portion of the 2D-CNN layers.

Classification units 106 that are each associated with a layer receive the modified aggregated feature descriptors and generate a video class scores (i.e., prediction) for the layer. The outputs of the FCs 135 are processed by a temporal max pooling layer 132 that applies a down-sampling operator to reduce temporal dimensions of internal multi-dimensional tensor and generate a prediction.

A set of FC layers may be represented as $F=\{f_{t,l}; t=1, \ldots, T; l=1, \ldots, L_f\}$, where T is the number of frames or short clips, $L_f$ is the number of FC layers in a CNN, and $f_{t,l} \in \mathbb{R}^{d_l}$ indicates the l-th FC layer computed at the timestamp t. The FC vector is more sensitive to the category-level semantic information and usually has high dimensions (e.g., $d_l$=4096). Compared to $c_{t,l}$ which can generate $s_l \times s_l$ feature descriptors, each of which includes $d_l$ elements, $f_{t,l}$ is far more sparse as spatial information is lost. Considering these properties, temporal max pooling may be applied to aggregate $f_{t,l}$ across time to obtain $f_l$, which is the initial representation of video data at the l-th FC layer.

While the last FC layer in a neural network performs linear classification, additional non-linearity may be injected to $f_l$ by using non-linear kernels in a support vector machine (SVM). However, non-linear SVM is generally much slower than a linear SVM in terms of both learning and prediction. In particular, a linear SVM may be trained in time linear with the number of training samples. This favorably extends the applicability of linear SVM algorithms to large-scale data, which is usually the case for video classification. An explicit feature map may be employed to approximate a large-scale non-linear SVM using a linear SVM. In an explicit feature map, the initial representation $f_l$ is lifted to a Hilbert space with moderately higher feature dimensions through $\psi: \mathbb{R}^{d_l} \to \mathbb{R}^{d_l(2z+1)}$ such that the inner product in the space can reasonably well approximate a non-linear kernel. Therefore, the final representation $\psi(f_l)$ of a FC layer makes use of not only the discriminative power of non-linear kernels, but also the efficient training and evaluation of the linear one.

A multi-layer fusing unit 107 receives the prediction output of the temporal max pooling layer 132 and the convolutional layer predictions and generates an output video class label. The fusing operations are described further herein in conjunction with step 166 of FIG. 1F.

Figure 1F:
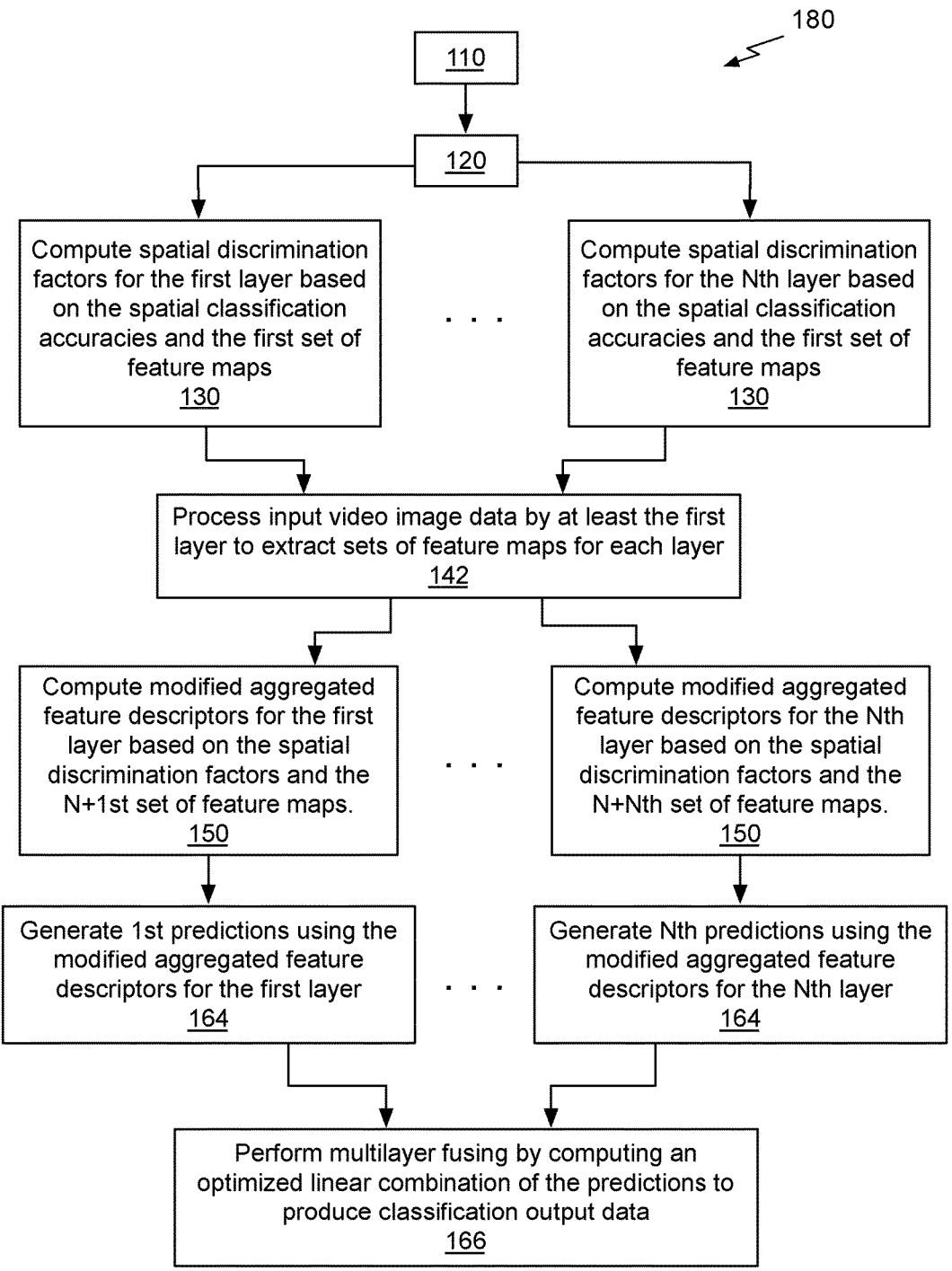
FIG. 1F illustrates a flowchart of a method for classifying video image data using multilayer fusing, in accordance with one embodiment.

FIG. 1F illustrates a flowchart of a method 180 for classifying video image data using multilayer fusing, in accordance with one embodiment. The method 180 is described in the context of a CNN, such as the CNN layer slices 138 in the video classification system 145, and the method 180 may also be performed by a program, custom circuitry, or by a combination of custom circuitry and a program. For example, the method 180 may be executed by a GPU, CPU, or any processor capable of performing the necessary processing operations. Furthermore, persons of ordinary skill in the art will understand that any system that performs method 180 is within the scope and spirit of embodiments of the present invention.

Steps 110, 120, and 130 are performed as previously described in conjunction with FIG. 1A to complete the training and post-processing. However, step 130 may be performed simultaneously for each layer of the CNN. At step 142, new input video image data is processed by at least the first layer of the CNN to extract sets of feature maps for each CNN layer slice 138.

At step 150, modified aggregated feature descriptors (i.e., wFVs) are computed for the CNN layer based on the spatial discriminative factor $w_j$ that were computed at step 130. Step 150 may be performed simultaneously for each CNN layer slice 138. In one embodiment, the modified aggregated feature descriptors are computed by the wFV computation unit 128 shown in FIG. 1B. At step 164, predictions are generated for the new input video image data using the modified aggregated feature descriptors for the layer. In one embodiment, a prediction is classification output data. Step 164 may be performed simultaneously for each layer of the CNN. At step 166, the multilayer fusing unit 107 performs multilayer fusing by computing an optimized linear combination of the predictions to produce classification output data. The multilayer fusing unit 107 receives the output of the temporal max pooling layer 132 and the convolutional layer predictions and generates the classification output data.

A coefficient may be learned during training for each CNN layer and each prediction for the layer may be scaled by the coefficient and summed to generate a class label by multilayer fusing. Similarly, a coefficient may be learned for each modality, and each prediction by a 2D-CNN or a 3D-CNN may be scaled by the coefficient for the modality and summed to generate a class label by multimodal fusing.

A training set for learning the coefficients may be represented by $\{(v_i, y_i)\}_{i=1}^{N}$ which contains N instance pairs of a video $v_i \in V$ and a class label $y_i \in \{1, \ldots, C\}$. Let $\{r_m: V \to \mathbb{R}^{d_m}\}_{m=1}^{M}$ indicate M video representations extracted by the proposed feature aggregation methods from CNN and FC layers of multiple modalities. A general kernel function $\kappa$ may be used to measure the similarity between instances by the m-th video representation: $\kappa_m(v,v') = \kappa(r_m(v), r_m(v'))$. So the kernel response of a given instance $v \in V$ to the training set is defined as $\mathcal{K}_m(v) = [\kappa_m(v,v_1), \ldots, \kappa_m(v,v_N)]^T$.

The following derivation focuses on the binary classification problem, which extends straightforwardly to multiple classes. Here the objective is to optimize a linear combination of the predictions using M representations: $U(v) = \sum_{m=1}^{M} \theta_m u_m(v)$, where $\theta_m$ is a mixing coefficient and $u_m$ is a decision function. SVM may be used with the decision function $u_m(v) = \mathcal{K}_m(v)^T a_m + b_m$, but the weak learner $u_m$ is not necessarily SVM. All parameters of the fusion model can be solved by training $u_m$ based on each individual video representation and subsequently optimizing $\theta_m$ through:

$$\arg\max_{\theta, \xi, \epsilon} \epsilon - \frac{1}{vN} \sum_{i=1}^{N} \xi_i$$

$$\text{s.t. } y_i \sum_{m=1}^{M} \theta_m u_m(v_i) + \xi_i \geq \epsilon, i = 1, \ldots, N$$

$$\sum_{m=1}^{M} \theta_m = 1, \theta_m \geq 0, m = 1, \ldots, M,$$

where $\xi_i$ is a slack variable and $v$ is a regularization parameter to control the smoothness of the resulting function. Optimizing $\theta_m$ may be solved as a linear programming problem using the column generation approach. Similar to image classification, in the multiclass case with C categories, there are two variations of the mixing coefficients. The first variant is referred to as boost-u that jointly learns a uniform coefficient vector $\theta \in \mathbb{R}^M$ for all classes. The alternative variant, boost-c learns a coefficient vector for each class resulting in a coefficient matrix $\Theta \in \mathbb{R}^{M \times C}$. So the final decision functions for the fusion of multiple layers and modalities with the two fusing variants are:

$$y(v) = \arg\max_{c=1,\ldots,C} \sum_{m=1}^{M} \theta_m (\mathcal{K}_m(v)^T a_{c,m} + b_{c,m}),$$

$$y(v) = \arg\max_{c=1,\ldots,C} \sum_{m=1}^{M} \Theta_m^c (\mathcal{K}_m(v)^T a_{c,m} + b_{c,m}).$$

The fusing algorithm is a unified method for both multilayer and multimodal fusion. It can be used by multilayer fusion to combine the video representations $r_m$ from multiple layers in a single modality. If the set of representations is extracted over multiple modalities, then the fusing algorithm performs multimodal fusion.

Figure 2A:
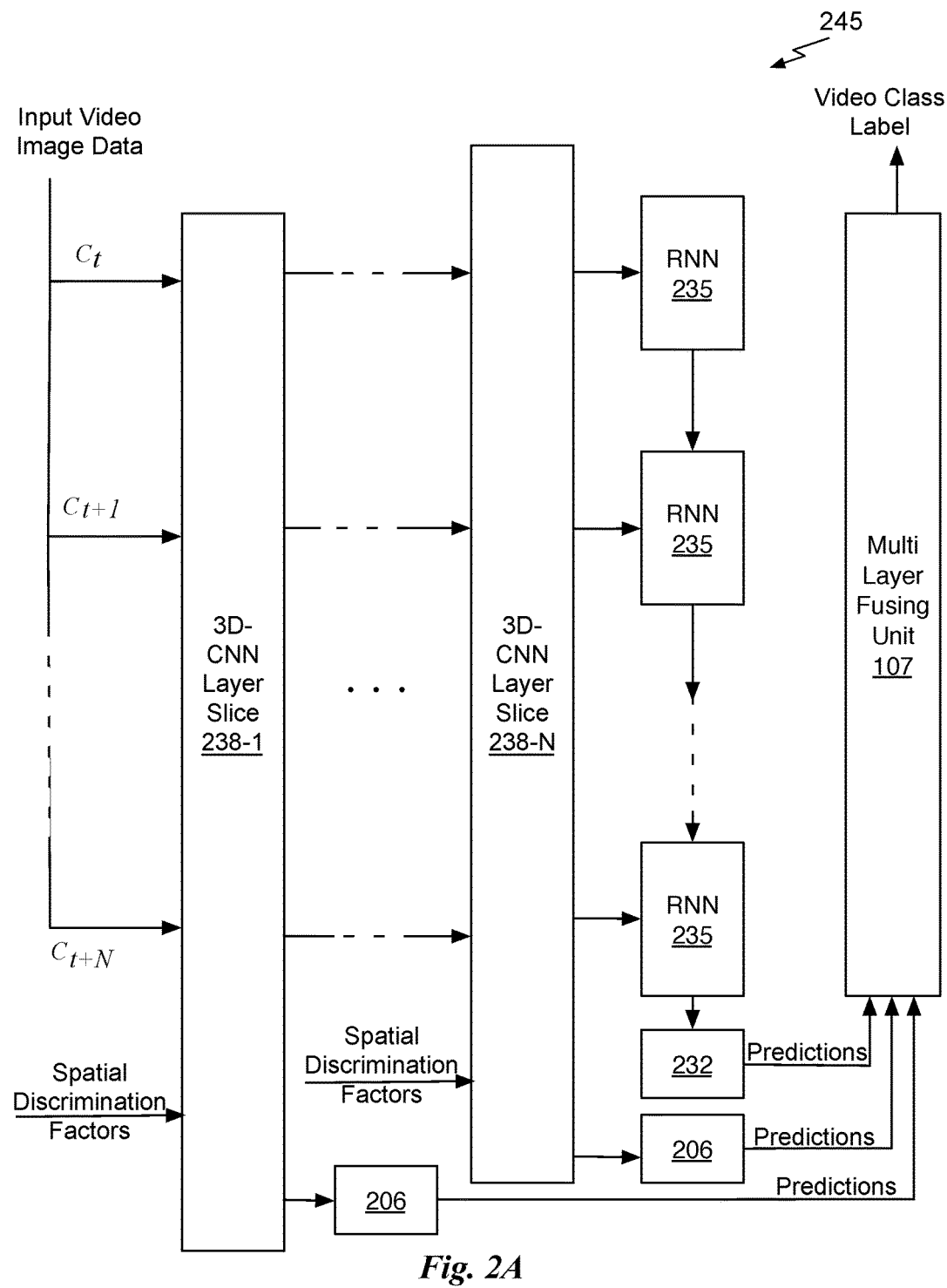
FIG. 2A illustrates a block diagram of another system that uses multilayer fusing to classify video image data, in accordance with one embodiment.

FIG. 2A illustrates a block diagram of another video classification system 245 that uses multilayer fusing to classify video image data, in accordance with one embodiment. In one embodiment, input video image data may be presented in the form of short clips $C_t$ of 16 or more frames to a 3D-CNN layer slice 238-1 for extracting local spatial-temporal features in the form of a feature map. Compared with the 2D-CNN layer slice 138, each 3D-CNN layer slice 238 is configured to process video clips, so that time t is the third dimension. A number N of 3D-CNN layer slices 238 may be connected in series and the feature maps generated by each layer are output to the subsequent layer slice, until a fully connected recurrent neural network (RNN) layer including RNNs 235 receives the last set of feature maps generated by the 3D-CNN layer slice 238-N. In one embodiment, the FCs 135 in the 2D-CNN 145 of FIG. 1E are replaced with the RNNs 235.

Each 3D-CNN layer slice 238 receives the spatial discrimination factors $w_j$ that were computed during post-processing for the particular layer and computes modified aggregated feature descriptors (i.e., wFVs). Although, as shown in FIG. 2A, spatial discrimination factors $w_j$ and wFVs are computed for all of the 3D-CNN layers, in other embodiments, spatial discrimination factors $w_j$ and wFVs may be computed for only a portion of the 3D-CNN layers.

Classification units 206 that are each associated with a layer receive the modified aggregated feature descriptors and generate a prediction for the layer. The outputs of the RNNs 235 are processed by a pooling layer 232 that applies a down-sampling operator to reduce temporal dimensions of internal multi-dimensional tensor. The multi-layer fusing unit 107 receives the prediction output of the pooling layer 232 and the per-layer predictions and generates an output video class label.

Since the visual information in videos is a juxtaposition of not only scenes and objects but also atomic actions evolving over the whole video sequence, it is favorable to capture and combine both static appearances and dynamic motions. A multimodal approach is used to model a variety of semantic clues in multi-temporal scales. In one embodiment, four different modalities, which provide mutually complementary information in short, mid, and long-term temporal contexts are processed simultaneously and the results are then combined to produce a classification label.

Figure 2B:
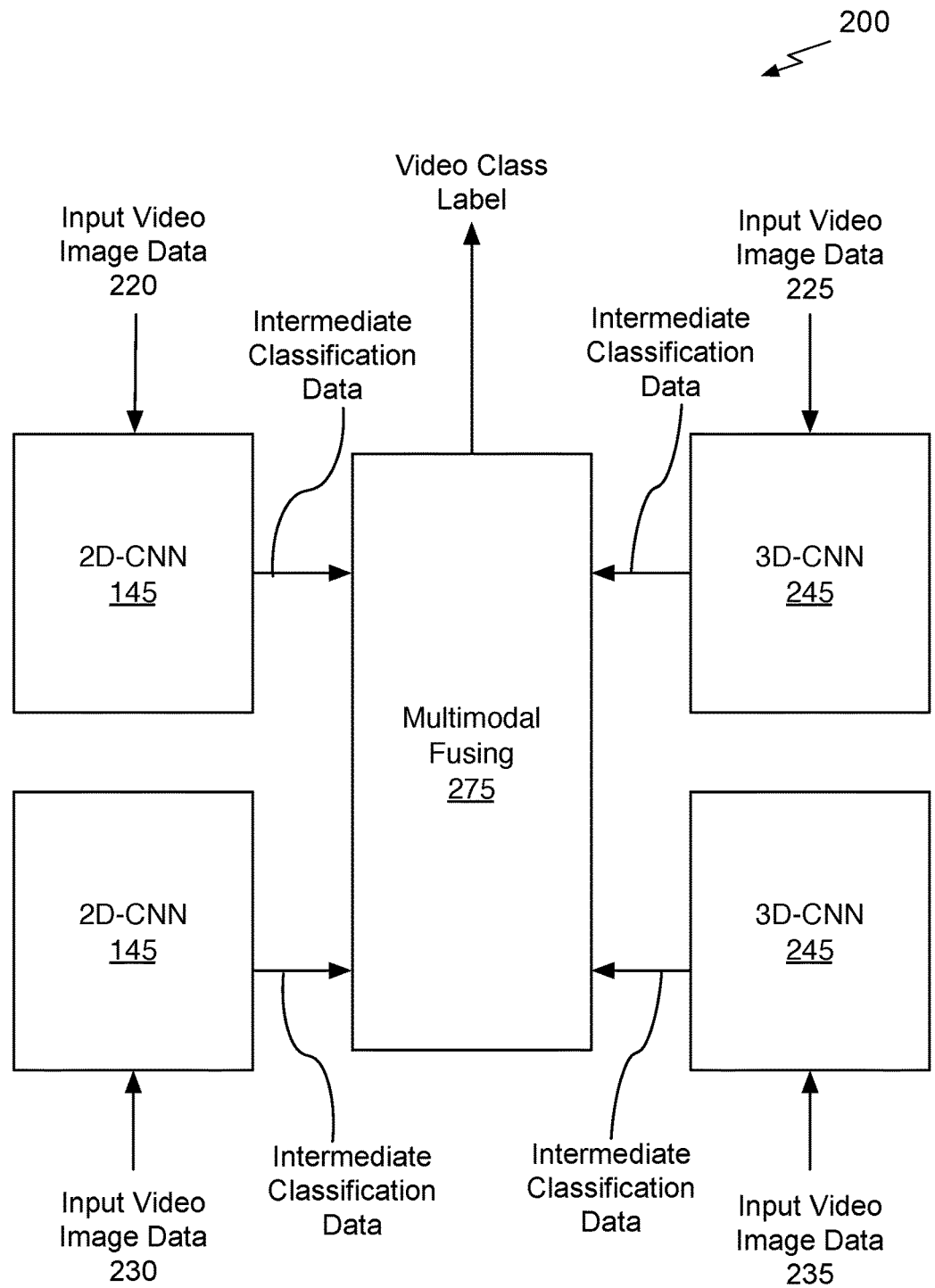
FIG. 2B illustrates a block diagram of a system that uses multilayer and multimodal fusing to classify video image data, in accordance with one embodiment.

FIG. 2B illustrates a block diagram of a video classification system 200 that uses multilayer and multimodal fusing to classify video image data, in accordance with one embodiment. In one embodiment, the four different modalities used to represent the video image data are 2D-CNN-SF, 2D-CNN-OF, 3D-CNN-SF, and 3D-CNN-OF. As shown in FIG. 2B, input video image data 220, 230, 225, and 235 are represented as spatial (single) frames (in 2D-CNN-SF), optical flow (in 2D-CNN-OF), spatial clips (in 3D-CNN-SF), and optical flow clips (in 3D-CNN-OF), respectively. The robust fusing model is employed to learn coefficients for the optimal combination of multiple layers and modalities.

The predictions generated by one or more layers within each 2D-CNN 115 and 3D-CNN 245 are fused by the multilayer fusing unit 107 to produce intermediate classification data for each modality. Coefficients corresponding to each layer are learned and used to scale the prediction for the layer. The scaled predictions are then combined by each multilayer fusing unit 107 to compute the intermediate classification data for each 2D-CNN 115 and 3D-CNN 245. The intermediate classification data associated with each modality is then fused by a multimodal fusing unit 275 to produce the classification output data. Coefficients corresponding to each modality are learned and used to scale the intermediate classification data for each 2D-CNN 115 and 3D-CNN 245. The scaled intermediate classification data are then combined by the multimodal fusing unit 275 to produce the classification output data.

The 2D-CNN 145 and 3D-CNN 245 receiving spatial frames (single frame in 2D-CNN-SF and short clip of frames in 3D-CNN-SF) as input video image data 220 and 225 can capture objects and scenes that are strongly correlated to certain video categories, e.g., snow and mountains indicating skiing. The 3D-CNN 245 processing the 3D-CNN-SF representation selectively attends to both motion and appearance cues through spatio-temporal convolution and pooling operations. The 3D-CNN 245 processing the 3D-CNN-SF representation encapsulates the mid-term temporal information as the 3D-CNN-SF input video image data 225 to the 3D-CNN 245 is a short video clip (e.g., 16 frames). The RNNs 235 within the 3D-CNN 245 learn the long-term temporal order.

Since optical flow explicitly captures dynamic motions, the 2D-CNN 145 and 3D-CNN 245 receiving optical flow images as input video image data 230 and 235 provide vital clues to recognize actions. Moreover, optical flow also conveys rough shape cues of moving objects, e.g., the skier and ski poles in skiing videos. In contrast to the temporal stream used in prior art techniques, which work on the stacked optical flow maps, a single colorized optical flow image is input to a 2D-CNN 145. A colorized optical flow image contains 3 channels of RGB values, while an optical flow map includes 2 channels with the raw values of horizontal and vertical displacements.

The hue and saturation of a colorized optical flow image indicate the flow's orientation and magnitude. Therefore, over-fitting and training time may be reduced by leveraging pre-trained models from large-scale image datasets for the colorized optical flow images. Because the input video image data is a single colorized image, the 2D-CNN 145 receiving the 2D-CNN-OF representation captures the fine-scale and short-term temporal information between a pair of adjacent frames. The 3D-CNN 245 receiving the 3D-CNN-OF representation models the high order motion cues such as spatial and temporal derivatives of optical flow. The 3D-CNN 245 receiving the 3D-CNN-OF representation also encapsulates the mid-term temporal clues. The RNN 235 may also be employed to learn the long-term temporal order of the 2D-CNN-OF and 3D-CNN-OF representations.

To obtain the final multimodal representation of a video, the aforementioned wFV is used as well as temporal max pooling and explicit feature maps to compute aggregated representations for selected CNN and FC layers (respectively for each modality). Given multiple layers and modalities, correlations across the different aggregated representations are utilized via multilayer and multimodal fusion to maximize the classification accuracy.

Figure 2C:
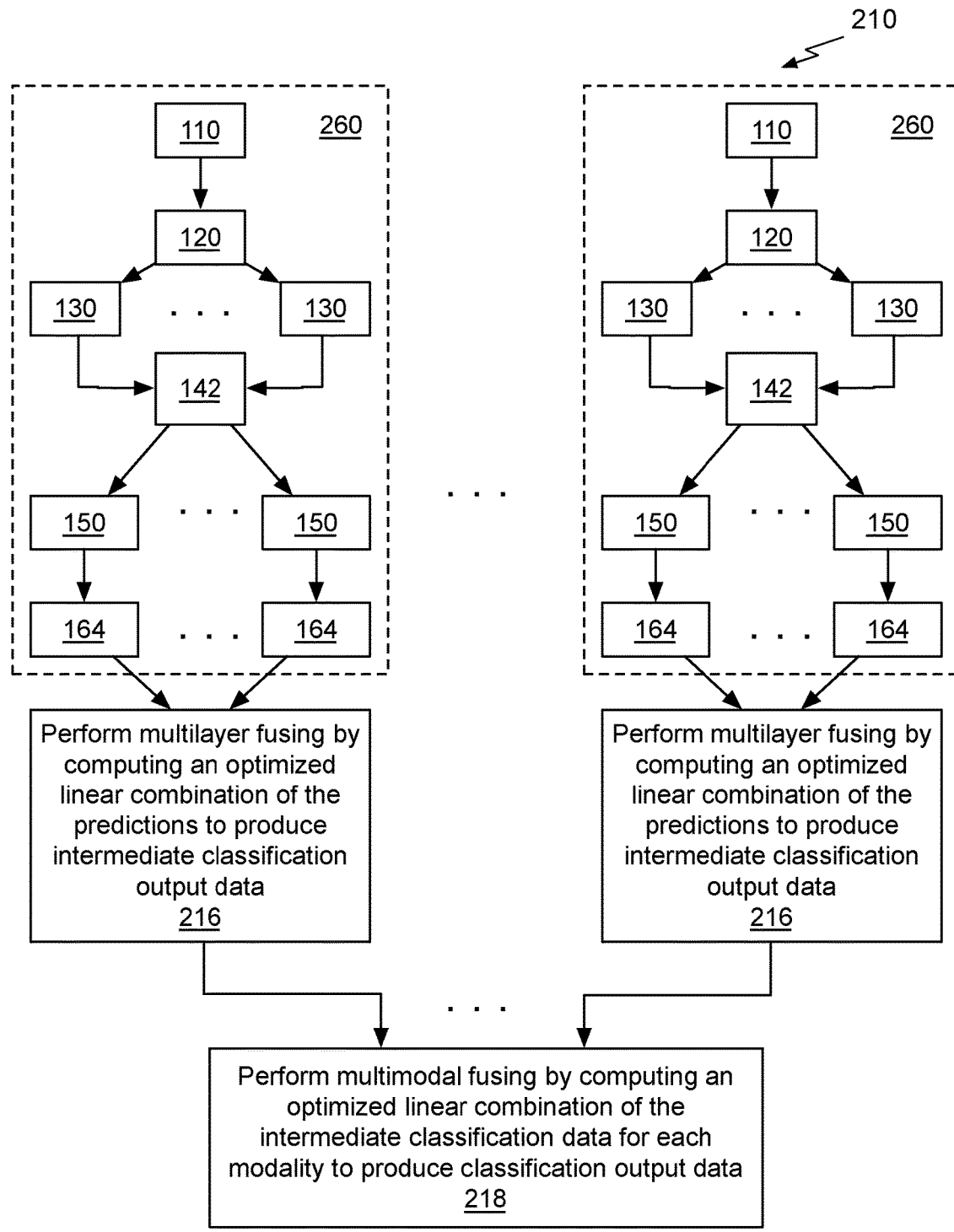
FIG. 2C illustrates a flowchart of a method for classifying video image data using the system of FIG. 2B, in accordance with one embodiment.

FIG. 2C illustrates a flowchart of a method for classifying video image data using the system of FIG. 2B, in accordance with one embodiment. The method 210 is described in the context of a video classification system, such as the video classification system 200 including the 2D-CNN 145 and 3D-CNN 245, and the method 210 may also be performed by a program, custom circuitry, or by a combination of custom circuitry and a program. For example, the method 210 may be executed by a GPU, CPU, or any processor capable of performing the necessary processing operations.

Furthermore, persons of ordinary skill in the art will understand that any system that performs method 210 is within the scope and spirit of embodiments of the present invention.

Steps 110, 120, 130, 142, 150, and 164 are included in a step 260 and are performed as previously described in conjunction with FIG. 1F to complete the training, post-processing, and inferencing for multiple layers of a CNN. The step 260 may be simultaneously performed by two or more CNNs (e.g., 2D-CNNs 145 and/or 3D-CNNs 245), where each CNN receives training input data and input data for a different modality.

After step 260 is completed, predictions for the new input video image data are available for each layer of the CNNs. At step 216, the multilayer fusing unit 107 within each CNN performs multilayer fusing by computing an optimized linear combination of the predictions to produce the intermediate classification data for each modality. Step 216 may be performed simultaneously for each modality. At step 218, the per-layer multimodal fusing unit 275 performs multimodal fusing by computing an optimized linear combination of the intermediate classification data for each modality to produce classification output data.

Figure 2D:
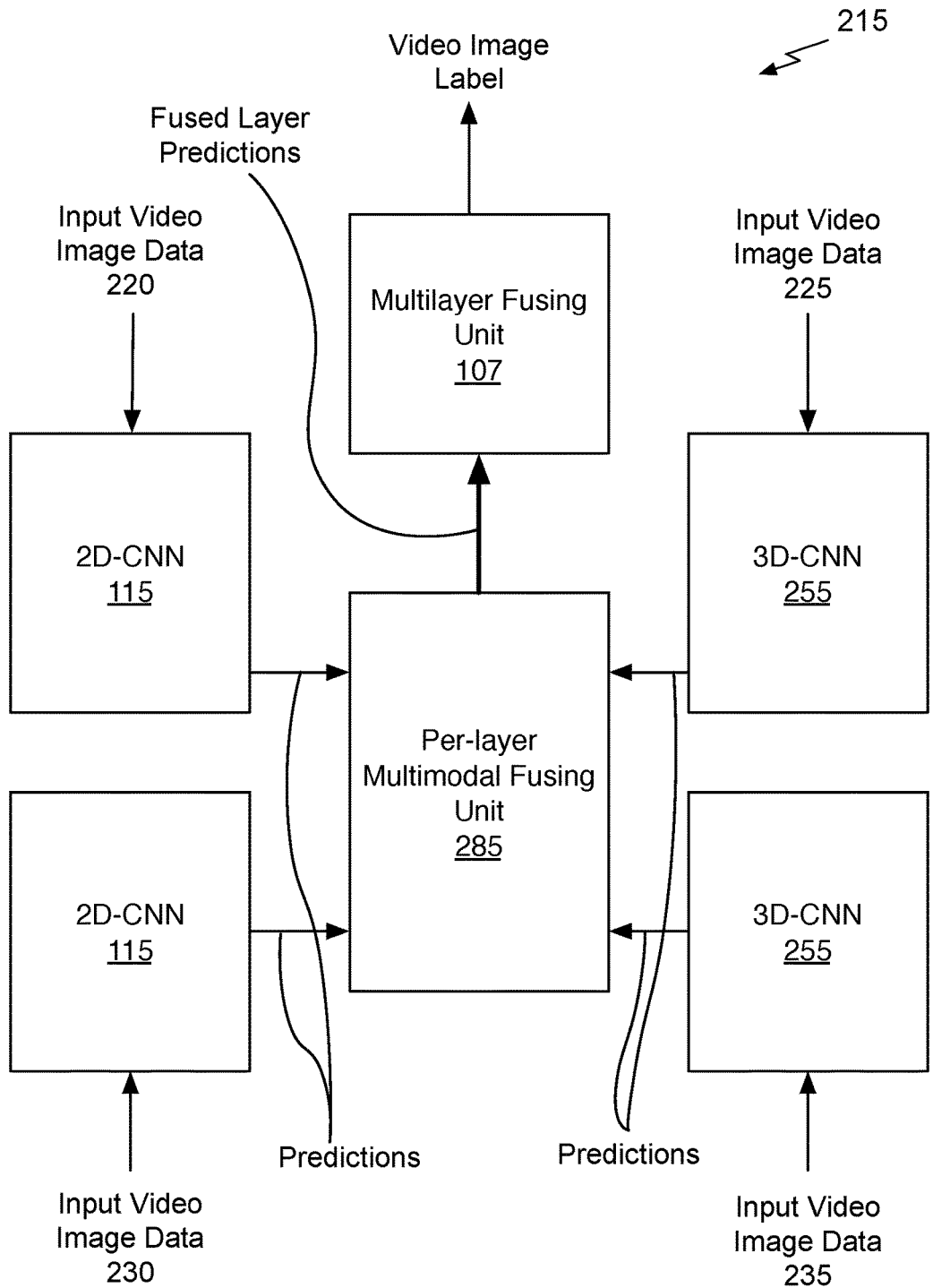
FIG. 2D illustrates a block diagram of a system that uses multimodal and multilayer fusing to classify video image data, in accordance with one embodiment.

FIG. 2D illustrates a block diagram of a video classification system 215 that uses multilayer and multimodal fusing to classify video image data, in accordance with one embodiment. In one embodiment, the four different modalities are 2D-CNN-SF, 2D-CNN-OF, 3D-CNN-SF, and 3D-CNN-OF representations of the input video image data. As shown in FIG. 2D, input video image data 220, 230, 225, and 235 are spatial (single) frames, optical flow, spatial clips, and optical flow clips, respectively. The robust fusing model is employed to learn the optimal combination of multiple modalities and layers. The 3D-CNNs 255 are the 3D-CNNs 245 without the multilayer fusing unit 107. The per-layer multimodal fusing unit 285 includes a multimodal fusing unit 275 for each CNN and FC layer. In contrast with the video classification system 200 shown in FIG. 2B, the different modalities are fused for each layer to generate a multimodal predication for each layer instead of fusing across the different layers within each modality.

The predictions generated by each layer of each 2D-CNN 115 and 3D-CNN 255 are fused across the different modalities by the per-layer multimodal fusing unit 285 to produce fused layer predictions for each layer. Coefficients corresponding to each modality are learned and used to scale the prediction for the modality. In one embodiment, the coefficients for a particular modality may vary for each layer. The scaled predictions are then combined by the per-layer multimodal fusing unit 285 to produce the fused layer predictions. The fused layer predictions are output by the per-layer multimodal fusing unit 285 to the multilayer fusing unit 107 to compute classification output data. Coefficients corresponding to each layer are learned and used to scale the corresponding fused layer predictions. The scaled fused layer predictions are then combined across the layers by the multilayer fusing unit 107 to produce the classification output data (i.e., video class label).

Figure 2E:
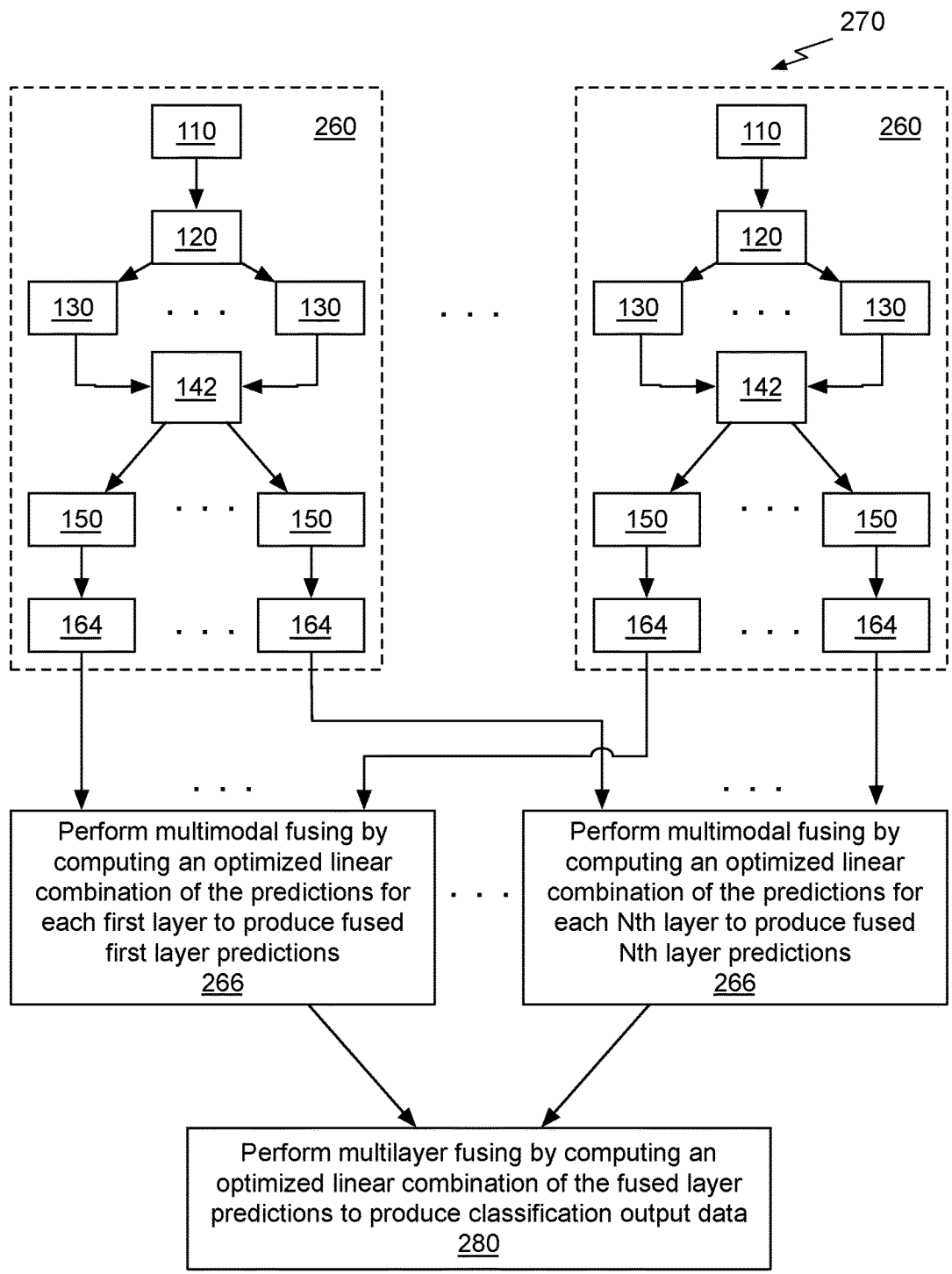
FIG. 2E illustrates a flowchart of a method for classifying video image data using the system of FIG. 2D, in accordance with one embodiment.

FIG. 2E illustrates a flowchart of a method 270 for classifying video image data using multilayer and multimodal fusing, in accordance with one embodiment. The method 270 is described in the context of a video classification system, such as the video classification system 215 including the 2D-CNN 115 and 3D-CNN 255, and the method 270 may also be performed by a program, custom circuitry, or by a combination of custom circuitry and a program. For example, the method 270 may be executed by a GPU, CPU, or any processor capable of performing the necessary processing operations. Furthermore, persons of ordinary skill in the art will understand that any system that performs method 270 is within the scope and spirit of embodiments of the present invention.

Steps 110, 120, 130, 142, 150, and 164 are included in the step 260 and are performed as previously described in conjunction with FIG. 1F to complete the training, post-processing, and inferencing for multiple layers of a CNN. The step 260 may be simultaneously performed by two or more CNNs (e.g., 2D-CNNs 115 and/or 3D-CNNs 255), where each CNN receives training input data and input data for a different modality.

After step 260 is computed, predictions for the new input video image data are available for each layer of the CNNs. At step 266, the per-layer multimodal fusing unit 285 performs multimodal fusing by computing an optimized linear combination of the predictions for each layer to produce fused layer predictions for each layer. For example, the predictions for the first layer are combined across each modality to produce a fused first layer prediction. A separate fused layer prediction is produced for each of the N layers. Step 266 may be performed simultaneously for each layer. At step 280, the multilayer fusing unit 107 performs multilayer fusing by computing an optimized linear combination of the fused layer predictions to produce classification output data.

The fusing algorithm is a unified method for both multilayer and multimodal fusion. As previously described in conjunction with step 166 of FIG. 1F, either the boost-u technique or the boost-c technique for learning coefficients may be used. As described in conjunction with FIGS. 2B and 2C, the fusing algorithm can be used by multilayer and multimodal fusion to combine the video representations $r_m$ from multiple layers in a single modality to produce per-modality intermediate classification data and then combine the multiple modalities. However, the joint fusion of the selected layers over all modalities to learn the coefficients may produce more accurate classification compared with the separate fusion of individual modalities first and then fusing the per-modality intermediate classification data. The improved classification may be because the joint fusion allows different modalities to explore better correlations at different layers.

Although boost-c is more flexible to have class-specific mixing coefficients, the results are inferior to those of boost-u. This is because the model of boost-c tends to over-fit, since the C×M parameters to fit in boost-c require more training data than the M parameters in boost-u. The 3D-CNN-SF produces the best results before fusion as it jointly models appearance and motion information.

TABLE 1 contains the classification accuracy for various of modalities when wFV is computed for the fourth and fifth CNN layers. K=128 Gaussian components for both FV and wFV techniques so the final feature dimensionality is 76.8K. As shown in TABLE 1, wFV consistently outperforms FV for CNN layers in all modalities with the improvements ranging from 0.6% to 2.5%. A larger improvement is observed for the fourth CNN layer (conv4) compared with the fifth CNN layer (conv5), probably because of the finer spatial information preserved in the fourth CNN layer. The improvements clearly show the advantages of utilizing the spatial discriminability learned by convlets to enhance the feature representation.

TABLE 1

Comparison of FV and wFV to represent
CNN layers of different modalities

| Modality | Layer | FV | wFV |
|---|---|---|---|
| 2D-CNN-SF | Conv4 | 74.2% | 76.7% |
| | Conv5 | 79.6% | 80.6% |
| 2D-CNN-OF | Conv4 | 75.6% | 78.1% |
| | Conv5 | 81.9% | 82.6% |
| 3D-CNN-SF | Conv4 | 83.6% | 84.8% |
| | Conv5 | 83.3% | 84.6% |
| 3D-CNN-OF | Conv4 | 78.2% | 78.8% |
| | Conv5 | 78.1% | 78.7% |

TABLE 2 contains the accuracy for various combinations of four modalities. Observe that fusing any pair of modalities improves individual results. The best classification accuracy of 91.9% is obtained by the combination of all four modalities.

TABLE 2

Classification accuracies of different modality combinations

| Modality | Accuracy | | | Combinations | | | | |
|---|---|---|---|---|---|---|---|---|
| 2D-CNN-SF | 83.2 | X | | X | X | X | | X |
| 2D-CNN-OF | 84.8 | X | X | | | X | X | X |
| 3D-CNN-SF | 85.9 | | X | X | | X | X | X |
| 3D-CNN-OF | 81.4 | | | | X | | X | X |
| Fusion Accuracy | | 90.3 | 90.8 | 87.1 | 90.4 | 91.2 | 91.3 | 91.9 |

In comparison to the results in TABLE 1, the multimodal fusion produces much higher accuracy than any individual modality. This indicates the strong complementarity between the four modalities that capture diverse static and dynamic features at multiple temporal scales.

Using the modified aggregated feature descriptors, wFV, to represent CNN layers in different modalities improves classification accuracy. Compared with conventional techniques, wFV retains high-order statistics; in particular, the modified aggregated feature descriptors (wFV) adaptively weight the features of a CNN layer according to the associated spatial weights learned by the proposed convlet. In one embodiment, computing the spatial discriminative weights using the sigmoid is more discriminative than using the softmax, e.g., wFV with sigmoid outperforms that with softmax by 0.6% for the fifth CNN layer when the input video image data is 2D-CNN-SF.

Parallel Processing Architecture

Figure 3:
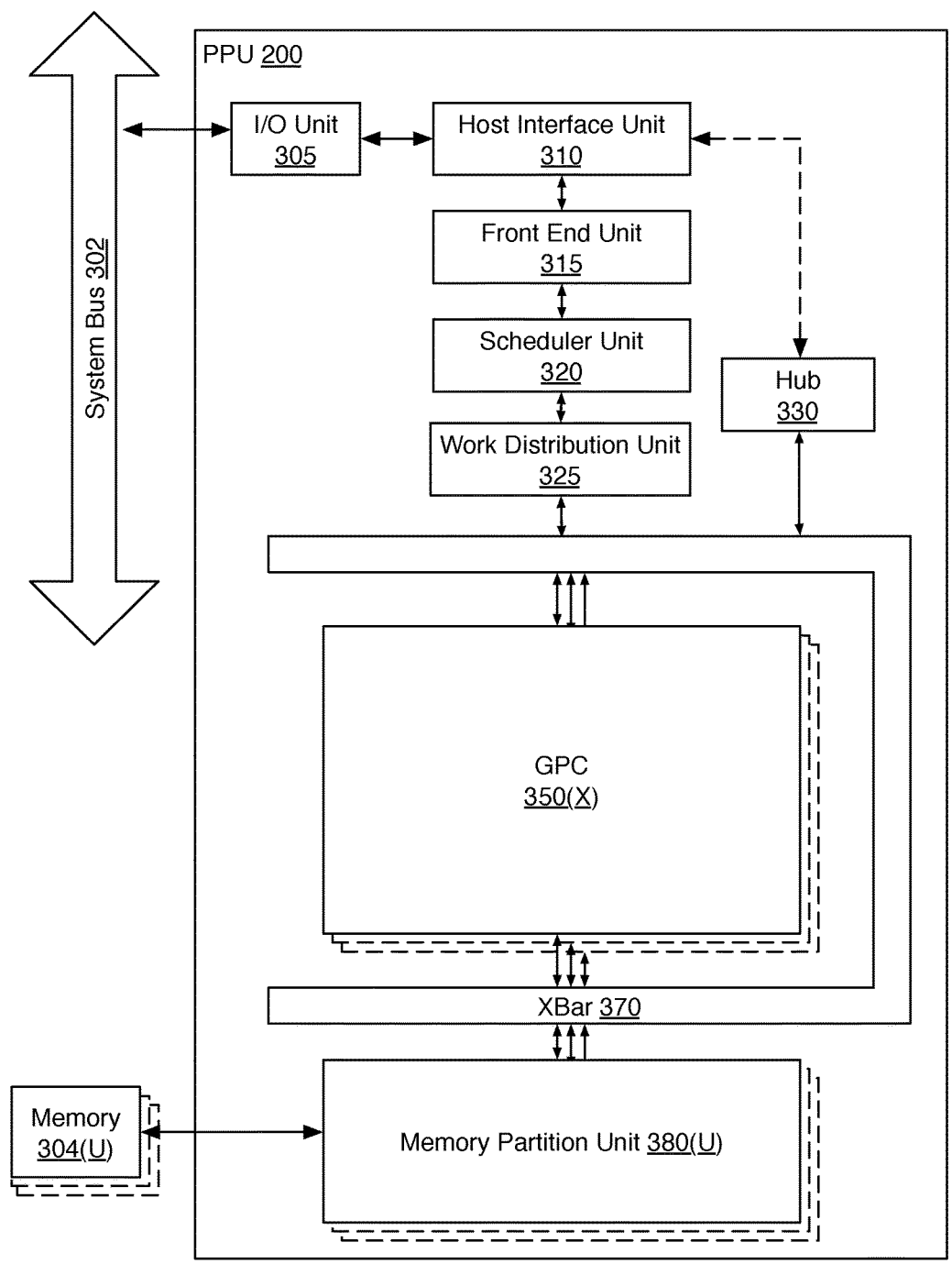
FIG. 3 illustrates a parallel processing unit, in accordance with one embodiment.

FIG. 3 illustrates a parallel processing unit (PPU) 300, in accordance with one embodiment. The PPU 300 may be configured to implement the video classification system 115, 145, 200, 215, or 245 and one or more layers of a 2D-CNN or a 3D-CNN.

In one embodiment, the PPU 300 is a multi-threaded processor that is implemented on one or more integrated circuit devices. The PPU 300 is a latency hiding architecture designed to process a large number of threads in parallel. A thread (i.e., a thread of execution) is an instantiation of a set of instructions configured to be executed by the PPU 300. In one embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 3, the PPU 300 includes an Input/Output (I/O) unit 305, a host interface unit 310, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other peripheral devices via a system bus 302. The PPU 300 may also be connected to a local memory comprising a number of memory devices 304. In one embodiment, the local memory may comprise a number of dynamic random access memory (DRAM) devices.

The I/O unit 305 is configured to transmit and receive communications (i.e., commands, data, etc.) from a host processor (not shown) over the system bus 302. The I/O unit 305 may communicate with the host processor directly via the system bus 302 or through one or more intermediate devices such as a memory bridge. In one embodiment, the I/O unit 305 implements a Peripheral Component Interconnect Express (PCIe) interface for communications over a PCIe bus. In alternative embodiments, the I/O unit 305 may implement other types of well-known interfaces for communicating with external devices.

The I/O unit 305 is coupled to a host interface unit 310 that decodes packets received via the system bus 302. In one embodiment, the packets represent commands configured to cause the PPU 300 to perform various operations. The host interface unit 310 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the host interface unit 310 is configured to route communications between and among the various logical units of the PPU 300.

In one embodiment, a program executed by the host processor encodes a command stream in a buffer that provides workloads to the PPU 300 for processing. A workload may comprise a number of instructions and data to be processed by those instructions. The buffer is a region in a memory that is accessible (i.e., read/write) by both the host processor and the PPU 300. For example, the host interface unit 310 may be configured to access the buffer in a system memory connected to the system bus 302 via memory requests transmitted over the system bus 302 by the I/O unit 305. In one embodiment, the host processor writes the command stream to the buffer and then transmits a pointer to the start of the command stream to the PPU 300. The host interface unit 310 provides the front end unit 315 with pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In one embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 are coupled to the host interface unit 310. The other units may also be connected to the XBar 370 via a hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. In one embodiment, the PPU 300 includes a number U of partition units 380 that is equal to the number of separate and distinct memory devices 304 coupled to the PPU 300. A partition unit 380 will be described in more detail below in conjunction with FIG. 4B.

In one embodiment, a host processor executes a driver kernel that implements an application programming interface (API) that enables one or more applications executing on the host processor to schedule operations for execution on the PPU 300. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 4A:
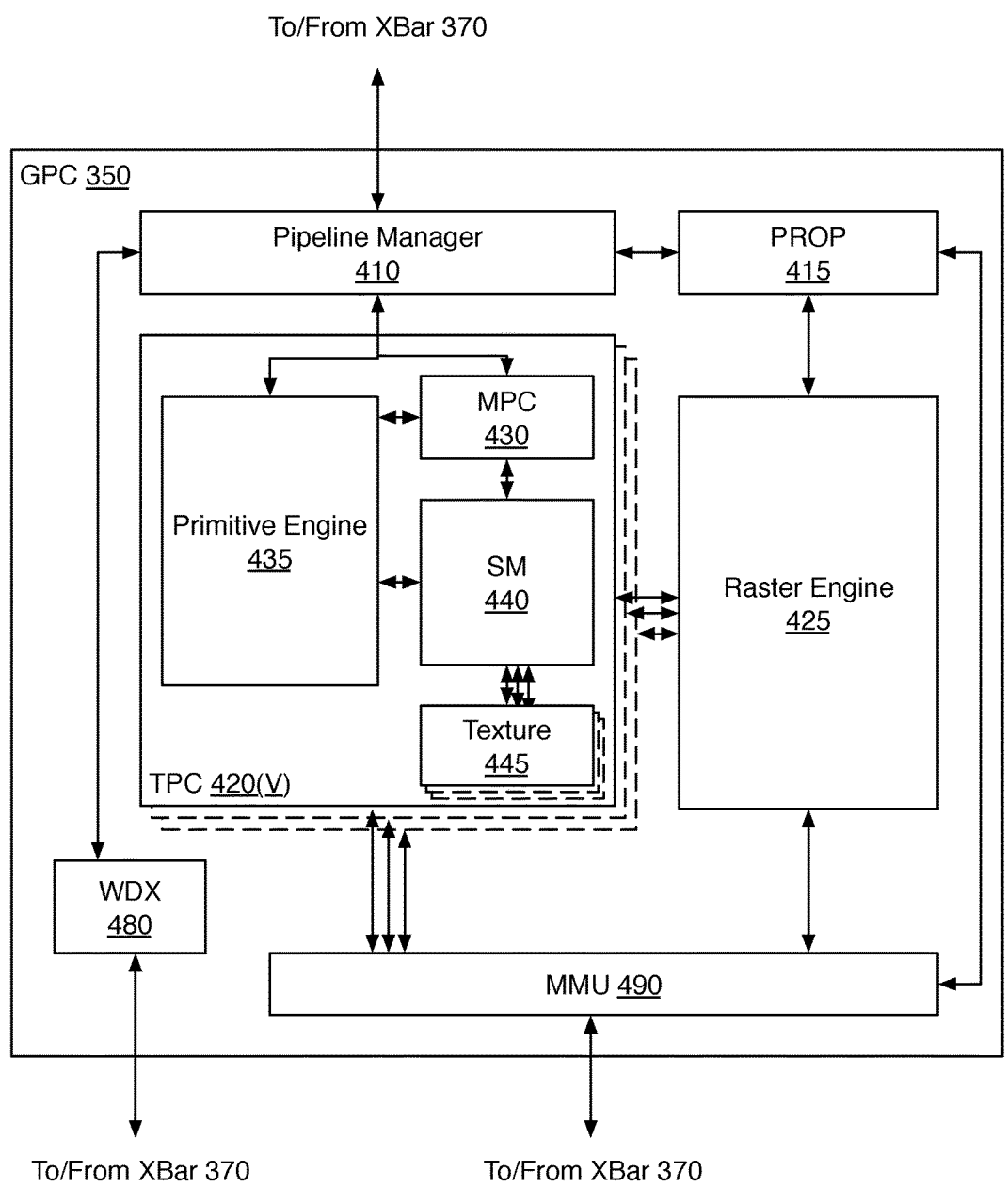
FIG. 4A illustrates a general processing cluster of the parallel processing unit of FIG. 3, in accordance with one embodiment.

FIG. 4A illustrates a GPC 350 of the PPU 300 of FIG. 3, in accordance with one embodiment. As shown in FIG. 4A, each GPC 350 includes a number of hardware units for processing tasks. In one embodiment, each GPC 350 includes a pipeline manager 410, a pre-raster operations unit (PROP) 415, a raster engine 425, a work distribution crossbar (WDX) 480, a memory management unit (MMU) 490, and one or more Texture Processing Clusters (TPCs) 420. It will be appreciated that the GPC 350 of FIG. 4A may include other hardware units in lieu of or in addition to the units shown in FIG. 4A.

In one embodiment, the operation of the GPC 350 is controlled by the pipeline manager 410. The pipeline manager 410 manages the configuration of the one or more TPCs 420 for processing tasks allocated to the GPC 350. In one embodiment, the pipeline manager 410 may configure at least one of the one or more TPCs 420 to implement at least a portion of a graphics rendering pipeline. For example, a TPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the TPCs 420 for processing by the primitive engine 435 or the SM 440.

The PROP unit 415 is configured to route data generated by the raster engine 425 and the TPCs 420 to a Raster Operations (ROP) unit in the partition unit 380, described in more detail below. The PROP unit 415 may also be configured to perform optimizations for color blending, organize pixel data, perform address translations, and the like.

The raster engine 425 includes a number of fixed function hardware units configured to perform various raster operations. In one embodiment, the raster engine 425 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 425 comprises fragments to be processed, for example, by a fragment shader implemented within a TPC 420.

Each TPC 420 included in the GPC 350 includes an M-Pipe Controller (MPC) 430, a primitive engine 435, one or more SMs 440, and one or more texture units 445. The MPC 430 controls the operation of the TPC 420, routing packets received from the pipeline manager 410 to the appropriate units in the TPC 420. For example, packets associated with a vertex may be routed to the primitive engine 435, which is configured to fetch vertex attributes associated with the vertex from the memory 304. In contrast, packets associated with a shader program may be transmitted to the SM 440.

In one embodiment, the texture units 445 are configured to load texture maps (e.g., a 2D array of texels) from the memory 304 and sample the texture maps to produce sampled texture values for use in shader programs executed by the SM 440. The texture units 445 implement texture operations such as filtering operations using mip-maps (i.e., texture maps of varying levels of detail). The texture unit 445 is also used as the Load/Store path for SM 440 to MMU 490. In one embodiment, each TPC 420 includes two (2) texture units 445.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In one embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 440 may be described in more detail below in conjunction with FIG. 5.

The MMU 490 provides an interface between the GPC 350 and the partition unit 380. The MMU 490 may provide translation of virtual addresses into physical addresses, memory protection, and arbitration of memory requests. In one embodiment, the MMU 490 provides one or more translation lookaside buffers (TLBs) for improving translation of virtual addresses into physical addresses in the memory 304.

Figure 4B:
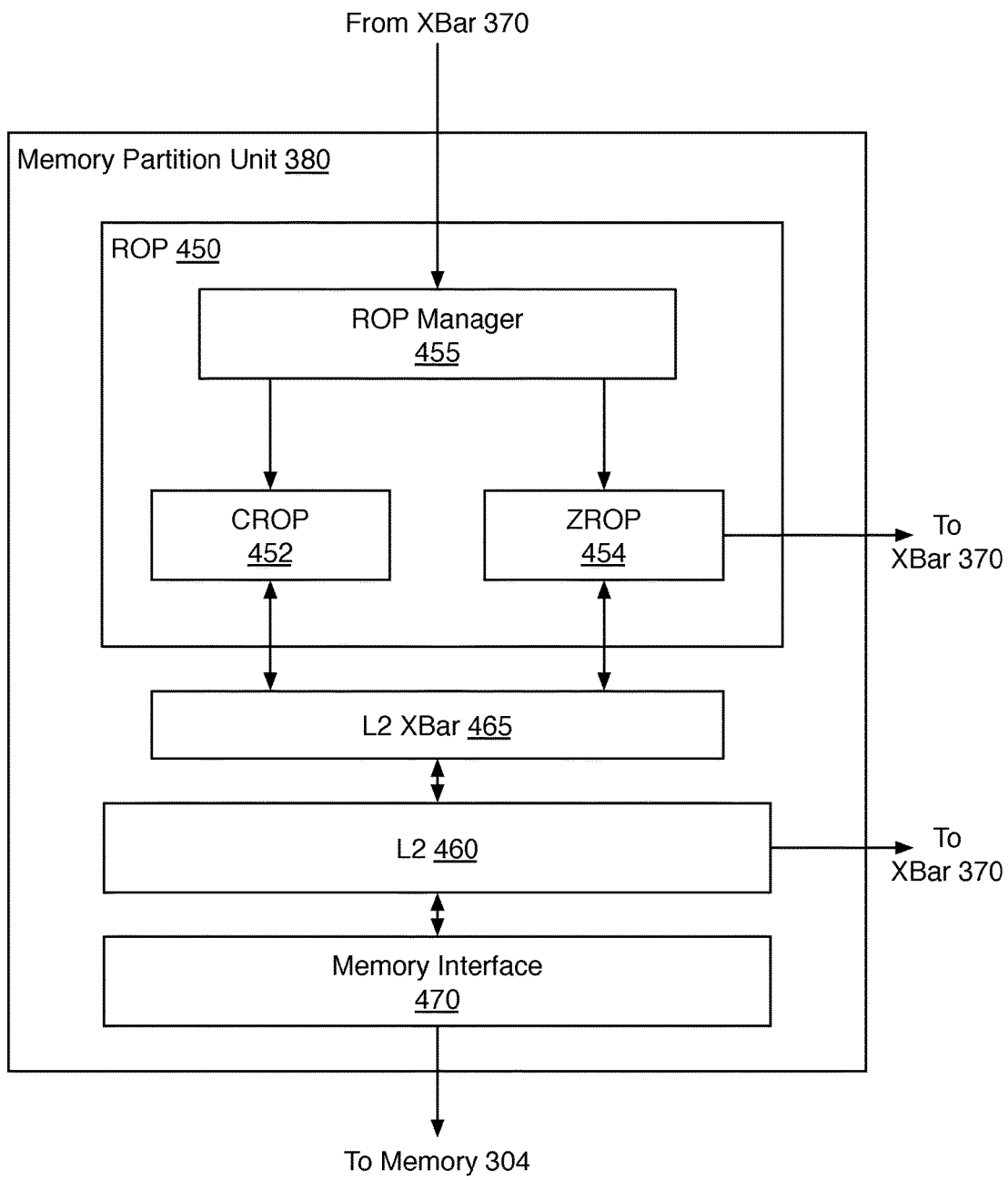
FIG. 4B illustrates a partition unit of the parallel processing unit of FIG. 3, in accordance with one embodiment.

FIG. 4B illustrates a memory partition unit 380 of the PPU 300 of FIG. 3, in accordance with one embodiment. As shown in FIG. 4B, the memory partition unit 380 includes a Raster Operations (ROP) unit 450, a level two (L2) cache 460, a memory interface 470, and an L2 crossbar (XBar) 465. The memory interface 470 is coupled to the memory 304. Memory interface 470 may implement 16, 32, 64, 128-bit data buses, or the like, for high-speed data transfer. In one embodiment, the PPU 300 comprises U memory interfaces 470, one memory interface 470 per partition unit 380, where each partition unit 380 is connected to a corresponding memory device 304. For example, PPU 300 may be connected to up to U memory devices 304, such as graphics double-data-rate, version 5, synchronous dynamic random access memory (GDDR5 SDRAM). In one embodiment, the memory interface 470 implements a DRAM interface and U is equal to 8.

In one embodiment, the PPU 300 implements a multi-level memory hierarchy. The memory 304 is located off-chip in SDRAM coupled to the PPU 300. Data from the memory 304 may be fetched and stored in the L2 cache 460, which is located on-chip and is shared between the various GPCs 350. As shown, each partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 includes a ROP Manager 455, a Color ROP (CROP) unit 452, and a Z ROP (ZROP) unit 454. The CROP unit 452 performs raster operations related to pixel color, such as color compression, pixel blending, and the like. The ZROP unit 454 implements depth testing in conjunction with the raster engine 425. The ZROP unit 454 receives a depth for a sample location associated with a pixel fragment from the culling engine of the raster engine 425. The ZROP unit 454 tests the depth against a corresponding depth in a depth buffer for a sample location associated with the fragment. If the fragment passes the depth test for the sample location, then the ZROP unit 454 updates the depth buffer and transmits a result of the depth test to the raster engine 425. The ROP Manager 455 controls the operation of the ROP unit 450. It will be appreciated that the number of partition units 380 may be different than the number of GPCs 350 and, therefore, each ROP unit 450 may be coupled to each of the GPCs 350. Therefore, the ROP Manager 455 tracks packets received from the different GPCs 350 and determines which GPC 350 that a result generated by the ROP unit 450 is routed to. The CROP unit 452 and the ZROP unit 454 are coupled to the L2 cache 460 via an L2 XBar 465.

Figure 5:
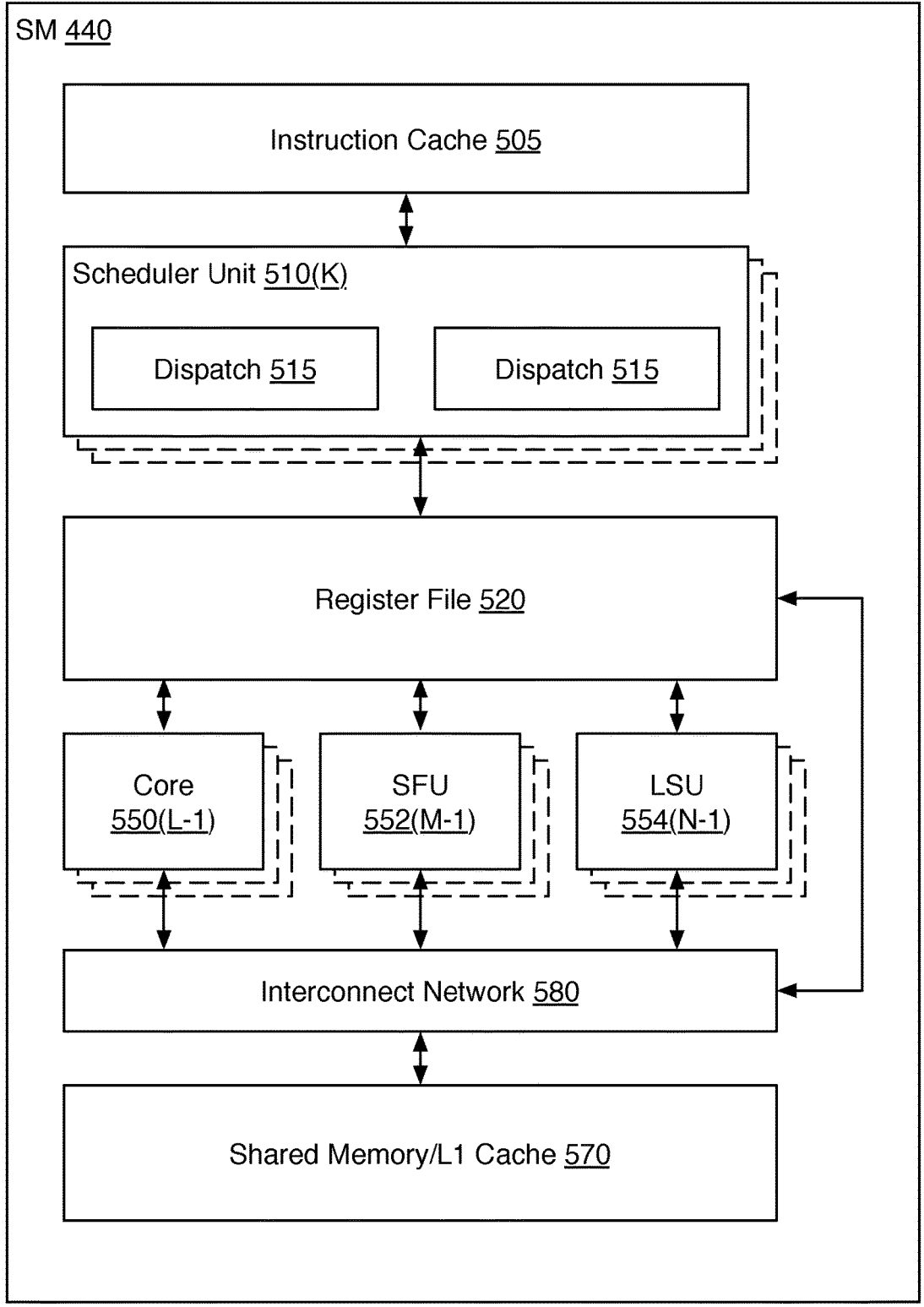
FIG. 5 illustrates the streaming multi-processor of FIG. 4A, in accordance with one embodiment.

FIG. 5 illustrates the streaming multi-processor 440 of FIG. 4A, in accordance with one embodiment. As shown in FIG. 5, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular TPC 420 within a GPC 350 and, if the task is associated with a shader program, the task may be allocated to an SM 440. The scheduler unit 510 receives the tasks from the work distribution unit 325 and manages instruction scheduling for one or more groups of threads (i.e., warps) assigned to the SM 440. The scheduler unit 510 schedules threads for execution in groups of parallel threads, where each group is called a warp. In one embodiment, each warp includes 32 threads. The scheduler unit 510 may manage a plurality of different warps, scheduling the warps for execution and then dispatching instructions from the plurality of different warps to the various functional units (i.e., cores 550, SFUs 552, and LSUs 554) during each clock cycle.

In one embodiment, each scheduler unit 510 includes one or more instruction dispatch units 515. Each dispatch unit 515 is configured to transmit instructions to one or more of the functional units. In the embodiment shown in FIG. 5, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In one embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In one embodiment, the SM 440 includes a large number (e.g., 128, etc.) of distinct processing cores 550. Each core 550 may include a fully-pipelined, single-precision processing unit that includes a floating point arithmetic logic unit and an integer arithmetic logic unit. The core 550 may also include a double-precision processing unit including a floating point arithmetic logic unit. In one embodiment, the floating point arithmetic logic units implement the IEEE 754-2008 standard for floating point arithmetic. Each SM 440 also comprises M SFUs 552 that perform special functions (e.g., attribute evaluation, reciprocal square root, and the like), and N LSUs 554 that implement load and store operations between the shared memory/L1 cache 570 and the register file 520. In one embodiment, the SM 440 includes 128 cores 550, 32 SFUs 552, and 32 LSUs 554.

Each SM 440 includes an interconnect network 580 that connects each of the functional units to the register file 520 and the LSU 554 to the register file 520, shared memory/L1 cache 570. In one embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In one embodiment, the shared memory/L1 cache 570 comprises 64 KB of storage capacity and is in the path from the SM 440 to the partition unit 380. The shared memory/L1 cache 570 can be used to cache reads and writes.

The PPU 300 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 3, fixed function graphics processing units are bypassed, creating a much simpler programming model. In this configuration, the work distribution unit 325 assigns and distributes blocks of threads directly to the TPCs 420. The threads in a block execute the same program, using a unique thread ID in the calculation to ensure each thread generates unique results, using the SM 440 to execute the program and perform calculations, shared memory/L1 cache 570 communicate between threads, and the LSU 554 to read and write Global memory through partition shared memory/L1 cache 570 and partition unit 380.

When configured for general purpose parallel computation, the SM 440 can also write commands that scheduler unit 320 can use to launch new work on the TPCs 420. In one embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (i.e., pixel data for each of the pixels of the display).

An application writes model data for a scene (i.e., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In one embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (i.e., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 300 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 300 is embodied on a single semiconductor substrate. In another embodiment, the PPU 300 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 300 may be included on a graphics card that includes one or more memory devices 304 such as GDDR5 SDRAM. The graphics card may be configured to interface with a PCIe slot on a motherboard of a desktop computer that includes, e.g., a northbridge chipset and a southbridge chipset. In yet another embodiment, the PPU 300 may be an integrated graphics processing unit (iGPU) included in the chipset (i.e., Northbridge) of the motherboard.

Various programs may be executed within the PPU 300 in order to implement the various CNN, FC 135, and RNN 235 layers of the video classification systems 115, 145, 200, 215, and 245. For example, the device driver may launch a kernel on the PPU 300 to implement at least one 2D or 3D CNN layer on one SM 440 (or multiple SMs 440). The device driver (or the initial kernel executed by the PPU 300) may also launch other kernels on the PPU 300 to perform other CNN layers, such as the FC 135, RNN 235 and the classifier 105, 106, or 206. In addition, some of the CNN layers may be implemented on fixed unit hardware implemented within the PPU 300. It will be appreciated that results from one kernel may be processed by one or more intervening fixed function hardware units before being processed by a subsequent kernel on an SM 440.

Exemplary System

Figure 6:
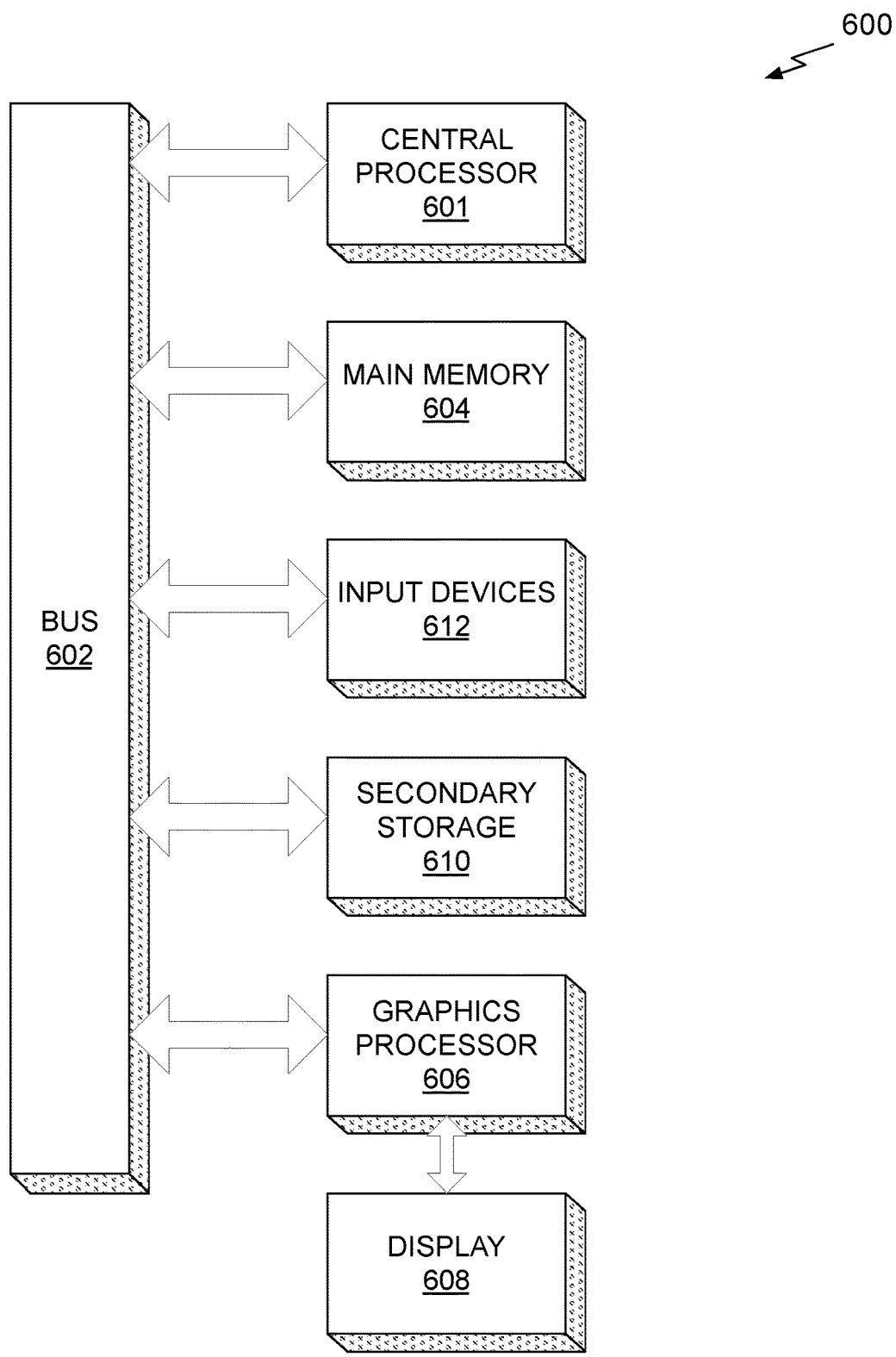
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. The exemplary system 600 may be used to implement the systems 115, 145, 200, and 245 for video classification.

As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The memory 604, the storage 610, and/or any other storage are possible examples of computer-readable media. Data streams associated with gestures may be stored in the main memory 604 and/or the secondary storage 610.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
processing training video image data by at least a first layer of a convolutional neural network (CNN) to extract a first set of feature maps;
processing the first set of feature maps by a second layer of the CNN to generate classification output data for the training video image data;
computing spatial classification accuracy data based on the classification output data and target classification output data;
computing spatial discrimination factors for the first layer based on the spatial classification accuracies and the first set of feature maps; and
computing second spatial discrimination factors for the second layer based on at least the spatial classification accuracies.

2. The computer-implemented method of claim 1, further comprising:
processing input video image data by at least the first layer to extract a second set of feature maps;
computing modified aggregated feature descriptors for the first layer based on the spatial discrimination factors and the second set of feature maps; and
generating additional classification output data for the input video image data using the modified aggregated feature descriptors for the first layer.

3. The computer-implemented method of claim 2, wherein the input video image data comprises a first modality that is processed by at least the first layer of the CNN and a second modality that is processed by at least a third layer of a second CNN to compute third spatial discrimination factors for the third layer, and further comprising:
processing the second modality by at least the third layer of the second CNN to extract a third set of feature maps; and
computing second modified aggregated feature descriptors for the third layer based on the third spatial discrimination factors and the third set of feature maps, wherein the additional classification output data is generated using the second modified aggregated feature descriptors for the third layer.

4. The computer-implemented method of claim 2, further comprising:
extracting a third set of feature maps for the second layer of the CNN during processing of the training video image data, wherein the
second spatial discrimination factors for the second layer are computed based on the spatial classification accuracies and the third set of feature maps.

5. The computer-implemented method of claim 4, further comprising computing second modified aggregated feature descriptors for the second layer based on the second spatial discrimination factors and the third set of feature maps, wherein the additional classification output data is generated using the second modified aggregated feature descriptors for the second layer.

6. The method of claim 2, wherein the spatial discriminative factors are applied to scale relative displacements of each element within the first set of feature maps for computing the modified aggregated feature descriptors.

7. The computer-implemented method of claim 1, wherein the first training data comprises a first modality that is processed by the at least first layer of the CNN and a second modality that is processed by at least a third layer of a second CNN to compute third spatial discrimination factors for the third layer.

8. The computer-implemented method of claim 1, wherein the spatial discriminative factors are computed using a sigmoid function.

9. The computer-implemented method of claim 1, wherein the spatial discriminative factors are computed using a softmax function.

10. The computer-implemented method of claim 1, wherein each feature map in the first set of feature maps is divided into pre-defined spatial regions that each include multiple elements of the feature map and each pre-defined spatial region is associated with one of the spatial discriminative factors.

11. The computer-implemented method of claim 10, wherein the training video image data is divided into multiple receptive fields that each include multiple pixels and each receptive field is associated with one of the pre-defined spatial regions.

12. A computer-implemented method, comprising:
processing training video image data by at least a first layer of a convolutional neural network (CNN) to extract a first set of feature maps and generate classification output data for the training video image data;
computing spatial classification accuracy data based on the classification output data and target classification output data;
computing spatial discrimination factors for the first layer based on the spatial classification accuracies and the first set of feature maps;
extracting a second set of feature maps for a second layer of the CNN during processing of the training video image data;
computing second spatial discrimination factors for the second layer based on the spatial classification accuracies and the second set of feature maps;
processing input video image data by the first layer to extract a third set of feature maps;
processing the third set of feature maps by the second layer to extract a fourth set of feature maps;
computing first modified aggregated feature descriptors for the first layer based on the spatial discrimination factors and the third set of feature maps;
computing second modified aggregated feature descriptors for the second layer based on the second spatial discrimination factors and the fourth set of feature maps;
generating first predictions using the first modified aggregated feature descriptors; and
generating second predictions using the second modified aggregated feature descriptors.

13. The computer-implemented method of claim 12, further comprising:
learning a first coefficient for the first layer;
learning a second coefficient for the second layer; and
summing the first predictions scaled by the first coefficient and the second predictions scaled by the second coefficient to generate intermediate classification data.

14. The computer-implemented method of claim 13, wherein the input video image data includes a first modality that is processed by the CNN and a second modality, and further comprising:
processing the second modality of the input video image data by at least a first layer of a second CNN to produce second intermediate classification data;
learning a third coefficient for the first modality;
learning a fourth coefficient for the second modality; and
summing the intermediate classification data scaled by the third coefficient and the second intermediate classification data scaled by the fourth coefficient to generate additional classification output data.

15. The computer-implemented method of claim 12, wherein the input video image data includes a first modality that is processed by the CNN and a second modality, and further comprising:
processing the second modality of the input video image data by a first layer of a second CNN to produce third predictions;
processing the second modality of the input video image data by a second layer of a second CNN to produce fourth predictions;
learning a first coefficient for the first layer of the first CNN;
learning a second coefficient for the first layer of the second CNN; and
summing the first predictions scaled by the first coefficient and the third predictions scaled by the second coefficient to generate fused first layer predictions.

16. The computer-implemented method of claim 15, wherein the input video image data includes a first modality that is processed by the CNN and a second modality, and further comprising:
processing the second modality of the input video image data by a second layer of a second CNN to produce fourth predictions;
learning a third coefficient for the second layer of the first modality;
learning a fourth coefficient for the second layer of the second modality;
summing the second predictions scaled by the third coefficient and the fourth predictions scaled by the fourth coefficient to generate fused second layer predictions; and
combining the fused first layer predictions and the fused second layer predictions to generate additional classification output data.

17. A system, comprising:
a memory storing training video image data;
a parallel processing unit that is coupled to the memory and configured to:
process training video image data by at least a first layer of a convolutional neural network (CNN) to extract a first set of feature maps and generate classification output data for the training video image data;
process the first set of feature maps by a second layer of the CNN to generate classification output data for the training video image data;
compute spatial classification accuracy data based on the classification output data and target classification output data;
compute spatial discrimination factors for the first layer based on the spatial classification accuracies and the first set of feature maps; and
compute second spatial discrimination factors for the second layer based on at least the spatial classification accuracies.

18. The system of claim 17, wherein the parallel processing unit is further configured to:
process input video image data by at least the first layer to extract a second set of feature maps;
compute modified aggregated feature descriptors for the first layer based on the spatial discrimination factors and the second set of feature maps; and
generate additional classification output data for the input video image data using the modified aggregated feature descriptors for the first layer.

19. A non-transitory computer-readable media storing computer instructions for classifying input video image data that, when executed by a processor, cause the processor to perform the steps of:
processing training video image data by at least a first layer of a convolutional neural network (CNN) to extract a first set of feature maps;
processing the first set of feature maps by a second layer of the CNN to generate classification output data for the training video image data;
computing spatial classification accuracy data based on the classification output data and target classification output data;
computing spatial discrimination factors for the first layer based on the spatial classification accuracies and the first set of feature maps; and
computing second spatial discrimination factors for the second layer based on at least the spatial classification accuracies.

20. The non-transitory computer-readable media of claim 19, further comprising
processing the input video image data by at least the first layer to extract a second set of feature maps;
computing modified aggregated feature descriptors for the first layer based on the spatial discrimination factors and the second set of feature maps; and
generating additional classification output data for the input video image data using the modified aggregated feature descriptors for the first layer.

* * * * *